(12) United States Patent
Kravchenko et al.

(10) Patent No.: US 12,351,483 B1
(45) Date of Patent: Jul. 8, 2025

(54) WATER HARVESTER

(71) Applicant: Water Harvesting, Inc., Fremont, CA (US)

(72) Inventors: Pavlo Kravchenko, Fremont, CA (US); Ievgen Kapustin, Fremont, CA (US)

(73) Assignee: Water Harvesting, Inc., Lakeview, CA (US)

( * ) Notice: Subject to any disclaimer, the term of this patent is extended or adjusted under 35 U.S.C. 154(b) by 0 days.

(21) Appl. No.: 18/934,454

(22) Filed: Nov. 1, 2024

(51) Int. Cl.
| | |
|---|---|
| *C02F 1/28* | (2023.01) |
| *B01J 20/10* | (2006.01) |
| *B01J 20/16* | (2006.01) |
| *B01J 20/18* | (2006.01) |
| *B01J 20/28* | (2006.01) |

(52) U.S. Cl.
CPC ............. *C02F 1/281* (2013.01); *B01J 20/103* (2013.01); *B01J 20/165* (2013.01); *B01J 20/18* (2013.01); *B01J 20/2803* (2013.01); *B01J 2220/46* (2013.01); *C02F 2201/002* (2013.01)

(58) Field of Classification Search
CPC ........ C02F 1/281; B01J 20/103; B01J 20/165; B01J 20/18; B01J 20/2803
See application file for complete search history.

(56) References Cited

U.S. PATENT DOCUMENTS

| | | | |
|---|---|---|---|
| 1,559,762 A | 11/1925 | Newman | |
| 4,180,985 A | 1/1980 | Northrup, Jr. | |
| 4,304,577 A | 12/1981 | Ito et al. | |
| 4,646,541 A | 3/1987 | Reid et al. | |
| 5,401,706 A | 3/1995 | Fischer | |
| 5,565,139 A | 10/1996 | Walker et al. | |
| 5,632,802 A | 5/1997 | Grgich et al. | |
| 5,632,954 A | 5/1997 | Coellner et al. | |
| 6,074,972 A | 6/2000 | Bratton et al. | |
| 6,334,316 B1 | 1/2002 | Maeda | |
| 6,684,648 B2 | 2/2004 | Faqih | |
| 6,699,426 B1 * | 3/2004 | Burke | C04B 28/14 |
| | | | 264/211 |
| 8,500,886 B2 | 8/2013 | Okano | |
| 8,627,673 B2 | 1/2014 | Hill et al. | |

(Continued)

FOREIGN PATENT DOCUMENTS

| | | |
|---|---|---|
| CA | 3120865 | 7/2023 |
| CN | 102639540 A | 8/2012 |

(Continued)

OTHER PUBLICATIONS

PCT International Patent Application No. PCT/IN23/50258, International Search Report and Written Opinion of the International Searching Authority dated Jul. 4, 2023, 10 pages.

(Continued)

*Primary Examiner* — Chester T Barry
(74) *Attorney, Agent, or Firm* — Craig R. Miles; CR MILES P.C.

(57) ABSTRACT

Sorbent compositions that are useful in the adsorption of water from the atmosphere. In particular embodiments, the sorbent compositions can be disposed alone as a sorbent layer or can be disposed as a sorbent layer on a substrate material, which can be reconfigured as a plurality of structural components that are useful in the assembly water capture modules disposed within an adsorption/desorption structure of a water harvester.

30 Claims, 10 Drawing Sheets

(56) References Cited

U.S. PATENT DOCUMENTS

| | | |
|---|---|---|
| 8,864,882 B2 | 7/2014 | Kametani |
| 9,134,038 B2 | 9/2015 | Lee et al. |
| 9,446,969 B1 | 9/2016 | Redman et al. |
| 10,168,057 B2 | 1/2019 | Goldsworthy et al. |
| 10,266,737 B2 | 4/2019 | Van Horn et al. |
| 10,695,741 B2 | 6/2020 | Motkuri et al. |
| 10,829,913 B1 | 11/2020 | Ahmed et al. |
| 10,857,855 B2 | 12/2020 | Tomita et al. |
| 10,948,202 B2 | 3/2021 | Lee et al. |
| 11,029,045 B2 | 6/2021 | Woods et al. |
| 11,065,573 B2 | 7/2021 | Matuska et al. |
| 11,679,339 B2 | 6/2023 | Van de Mortel |
| 12,000,122 B2 | 6/2024 | Yaghi et al. |
| 2003/0222023 A1* | 12/2003 | Mueller ............ B01J 20/28042 210/656 |
| 2004/0107832 A1 | 6/2004 | Tongue et al. |
| 2004/0123615 A1 | 7/2004 | Yabu |
| 2004/0123616 A1 | 7/2004 | Lee et al. |
| 2004/0244398 A1 | 12/2004 | Radermacher et al. |
| 2005/0044862 A1 | 3/2005 | Vetrovec et al. |
| 2006/0130652 A1 | 6/2006 | Takewaki et al. |
| 2007/0028769 A1 | 2/2007 | Eplee et al. |
| 2009/0139254 A1 | 6/2009 | Landry |
| 2009/0151368 A1 | 6/2009 | Bar |
| 2009/0260385 A1 | 10/2009 | Hill et al. |
| 2010/0126344 A1 | 5/2010 | Stein et al. |
| 2010/0175557 A1 | 7/2010 | Shih et al. |
| 2011/0056220 A1 | 3/2011 | Caggiano |
| 2011/0088552 A1 | 4/2011 | Ike et al. |
| 2011/0296858 A1 | 12/2011 | Caggiano |
| 2012/0172612 A1 | 7/2012 | Yaghi et al. |
| 2013/0036913 A1 | 2/2013 | Fukudome |
| 2013/0061752 A1 | 3/2013 | Farha et al. |
| 2013/0192281 A1* | 8/2013 | Nam .................. B01J 20/226 62/476 |
| 2013/0269522 A1 | 10/2013 | DeValve |
| 2013/0312451 A1 | 11/2013 | Max |
| 2014/0138236 A1 | 5/2014 | White |
| 2014/0165637 A1 | 6/2014 | Ma |
| 2014/0287150 A1 | 9/2014 | Miljkovic et al. |
| 2014/0326133 A1 | 11/2014 | Wang et al. |
| 2014/0338425 A1 | 11/2014 | Kalbassi et al. |
| 2016/0030858 A1 | 2/2016 | Giacomini |
| 2016/0084541 A1 | 3/2016 | Aguado et al. |
| 2016/0334145 A1 | 11/2016 | Pahwa et al. |
| 2017/0008915 A1 | 1/2017 | Yaghi et al. |
| 2017/0113184 A1 | 4/2017 | Eisenberger |
| 2017/0129307 A1 | 5/2017 | Zhou et al. |
| 2017/0211851 A1 | 7/2017 | Feng et al. |
| 2017/0234576 A1 | 8/2017 | Kawagoe et al. |
| 2017/0292737 A1 | 10/2017 | Moon |
| 2017/0354920 A1 | 12/2017 | Switzer et al. |
| 2018/0043295 A1 | 2/2018 | Friesen et al. |
| 2018/0171604 A1 | 6/2018 | Kim et al. |
| 2018/0209123 A1 | 6/2018 | Bahrami et al. |
| 2018/0261882 A1 | 9/2018 | Chang et al. |
| 2019/0100903 A1 | 4/2019 | Panda et al. |
| 2019/0217270 A1* | 7/2019 | Hinestroza ............ F17C 11/007 |
| 2019/0234053 A1 | 8/2019 | Kim et al. |
| 2019/0323714 A1 | 10/2019 | Cui |
| 2020/0009497 A1 | 1/2020 | Matuska et al. |
| 2020/0182734 A1 | 6/2020 | Ueno et al. |
| 2020/0206679 A1 | 7/2020 | Stuckenberg |
| 2020/0220136 A1* | 7/2020 | Wang .................. H01M 50/446 |
| 2020/0283997 A1 | 9/2020 | Salloum et al. |
| 2020/0316514 A1 | 10/2020 | Fuchs et al. |
| 2020/0363078 A1* | 11/2020 | Mulet .................. B01D 53/047 |
| 2021/0062478 A1 | 3/2021 | Friesen et al. |
| 2021/0156124 A1 | 5/2021 | Yaghi et al. |
| 2021/0237535 A1 | 8/2021 | Goel et al. |
| 2021/0283528 A1 | 9/2021 | Pokorny et al. |
| 2021/0283574 A1 | 9/2021 | Yaghi et al. |
| 2022/0001328 A1 | 1/2022 | Yoon et al. |
| 2022/0106203 A1* | 4/2022 | Marchon .................. C02F 1/14 |
| 2022/0170247 A1 | 6/2022 | Yaghi et al. |
| 2022/0389691 A1 | 12/2022 | Kuo et al. |
| 2023/0063572 A1 | 3/2023 | Kapustin |
| 2023/0264138 A1 | 8/2023 | McGrail et al. |

FOREIGN PATENT DOCUMENTS

| | | |
|---|---|---|
| CN | 106029674 A | 10/2016 |
| CN | 205718197 | 11/2016 |
| CN | 1077722290 A | 2/2018 |
| CN | 114182784 A | 3/2022 |
| CZ | 2018-337 | 7/2019 |
| EP | 0816225 A1 | 1/1998 |
| EP | 2507247 A1 | 10/2012 |
| EP | 3721971 A1 | 10/2020 |
| GB | 2540798 A | 2/2017 |
| JP | S63-107720 A | 5/1988 |
| JP | 2013-512223 A | 4/2013 |
| JP | 2017-509607 A | 4/2017 |
| JP | 2018080146 A | 5/2018 |
| WO | WO 03/097216 A1 | 11/2003 |
| WO | WO 2015/127033 A1 | 8/2015 |
| WO | WO 2016/186454 A1 | 11/2016 |
| WO | WO 2018/118377 A1 | 6/2018 |
| WO | WO 2018/230430 A1 | 12/2018 |
| WO | WO 2019/010102 A1 | 1/2019 |
| WO | WO 2019/058158 A1 | 3/2019 |
| WO | WO 2019/082000 A1 | 5/2019 |
| WO | WO 2019/152962 A2 | 8/2019 |
| WO | WO 2020/036905 A1 | 2/2020 |
| WO | WO 2020/099561 A1 | 5/2020 |
| WO | WO 2020/112899 | 6/2020 |
| WO | WO 2020/154427 A1 | 7/2020 |
| WO | WO 2021/034477 A1 | 2/2021 |
| WO | WO 2021/067179 A1 | 4/2021 |
| WO | WO 2021/162894 A1 | 8/2021 |
| WO | WO 2023/146800 A1 | 8/2023 |
| WO | WO 2023/181058 A1 | 9/2023 |

OTHER PUBLICATIONS

PCT International Patent Application No. PCT/US19/63442, International Search Report and Written Opinion of the International Searching Authority dated Jan. 22, 2020, 7 pages.

PCT International Patent Application No. PCT/US20/14647, International Search Report and Written Opinion of the International Searching Authority dated May 5, 2020, 11 pages.

PCT International Patent Application No. PCT/US20/53052, International Search Report and Written Opinion of the International Searching Authority dated Jan. 4, 2021, 10 pages.

PCT International Patent Application No. PCT/US21/16261, International Search Report and Written Opinion of the International Searching Authority dated Apr. 16, 2021, 8 pages.

PCT International Patent Application No. PCT/US21/47491, International Search Report and Written Opinion of the International Searching Authority dated Dec. 7, 2021, 9 pages.

PCT International Patent Application No. PCT/US22/12990, International Search Report and Written Opinion of the International Searching Authority dated Apr. 7, 2021, 14 pages.

PCT International Patent Application No. PCT/US22/26153, International Search Report and Written Opinion of the International Searching Authority dated Jul. 28, 2022, 18 pages.

PCT International Patent Application No. PCT/US22/41142, International Search Report and Written Opinion of the International Searching Authority dated Jan. 20, 2023, 12 pages.

PCT International Patent Application No. PCT/US23/33098, International Search Report and Written Opinion of the International Searching Authority dated Nov. 30, 2023, 11 pages.

PCT International Patent Application No. PCT/US23/33101, International Search Report and Written Opinion of the International Searching Authority dated Feb. 8, 2024, 16 pages.

Brazilian Patent Application No. BR112021002648-7, Office Action mailed Jul. 3, 2023, 4 pages.

Brazilian Patent Application No. BR112021010139-0, Office Action mailed Jul. 9, 2023, 4 pages.

(56) References Cited

OTHER PUBLICATIONS

Canadian Patent Application No. 3,167,734, Office Action dated Aug. 31, 2023, 6 pages.
Canadian Patent Application No. 3,171,282, Office Action dated Oct. 27, 2023, 11 pages.
Japanese Patent Application No. 2021-529709, Office Action dated Nov. 21, 2023, 6 pages.
Philippine Patent Application No. Jan. 2021/551201, Substantive Examination Report dated Sep. 6, 2023, 6 pages.
U.S. Appl. No. 17/424,147, Office Action mailed Oct. 2, 2023.
U.S. Appl. No. 17/763,413, Office Action mailed Feb. 6, 2024.
U.S. Appl. No. 18/077,417, Office Action mailed Jan. 17, 2024.
U.S. Appl. No. 18/077,417, Office Action mailed Mar. 29, 2024.
U.S. Appl. No. 18/371,700, Office Action mailed Apr. 18, 2024.
U.S. Appl. No. 18/384,992, Office Action mailed Jan. 23, 2024.
Canivet et al. Water adsorption in MOFs: fundamentals and applications. Chem. Soc. Rev., Aug. 2014, 43(16):5594-5617.
Clus et al. Study of dew water collection in humid tropical islands. Hydrol., Oct. 2008, 361(1-2):159-171.
Ding et al. Carbon capture and conversion using metal-organic frameworks and MOF-based materials. Chem. Soc. Rev., May 2019, 48(2):2783-2828.
Fang et al. One-Pot Synthesis of Two-Linker Mixed Al-Based Metal-Organic Frameworks for Modulated Water Vapor Adsorption. Cryst. Growth Des., Aug. 2020, 20, 10, 6565-6572.
Fathieh et al. Practical water production from desert air. Sci. Adv., Jun. 2018, 4(6):eaat3198.
Fracaroli et al. Metal-Organic Frameworks with Precisely Designed Interior for Carbon Dioxide Capture in the Presence of Water. Am. Chem. Soc., Jun. 2014, 136, pp. 8863-8866.
Furukawa et al. Water Adsorption in Porous Metal-Organic Frameworks and Related Materials. J. Am. Chem. Soc., Mar. 2014, 136, 11, 4369-4381.
Gleick. Water in Crisis: A Guide to the World's Fresh Water Resources. Chapter 2, pp. 13-24. Aug. 1993, Oxford University Press, New York, USA.
Global Cooling Prize. Transaera and partner Haier. Website, https://globalcoolingprize.org/transaera-inc/, originally downloaded Nov. 21, 2022, 3 pages.
Hanikel et al. Rapid Cycling and Exceptional Yield in a Metal-Organic Frameworks for Water Harvester. ACS Cent. Sci., Aug. 2019, 5(10):1699-1706.
Janiak et al. Solid-Solution Mixed-Linker Synthesis of Isoreticular Al-Based MOFs for and Easy Hydrophilicity Tuning in Water-Sorption Heat Transformations. Chem. Mater., May 2019, 31, 11, 4051-4062.
Kalmutzki et al. Metal-Organic Frameworks for Water Harvesting from Air; Adv. Mater. Sep. 2018, 30(37):1704304.
Kim et al. Water harvesting from air with metal-organic frameworks powered by natural sunlight. Science, Apr. 2017, 356:430-434.
Klemm et al. Fog as a Fresh-Water Resource: Overview and Perspectives. Ambio, May 2012, 41(3):221-234.
Kummer et al. A functional full-scale heat exchanger coated with aluminum fumarate metal-organic framework for adsorption heat transformation. Ind. Eng. Chem. Res., Jul. 2017, 56(29):8393-8398.
Lee et al. Water harvest via dewing. Langmuir, Jun. 2012, 28(27):10183-10191.
Li et al. Incorporation of Alkylamine into Metal-Organic Frameworks through a Brønsted Acid-Base Reaction for CO2 Capture. ChemSusChem., Oct. 2016, 9(19):2832-2840.
Muselli et al. Dew water collector for potable water in Ajaccio (Corsica Island, France). Atmos. Res., Sep. 2002,64,297-312.
Park et al. Optimal Design of Permeable Fiber Network Structures for Fog Harvesting. Langmuir, Oct. 2013, 29(43):13269-13277.
Schemenauer et al. A Proposed Standard Fog Collector for Use in High-Elevation Regions. Appl. Meteorol., Nov. 1994, 33(11):1313-1322.
Tu et al. Progress and Expectation of Atmospheric Water Harvesting. Joule, Aug. 2018, 2(8):1452-1478.
Wahlgren. Atmospheric Water Vapour Processor Designs for Potable Water Production: A Review. Water Res., Jan. 2001, 35(1):1-22.
Zhou et al. Atmospheric Water Harvesting: A Review of Material and Structural Designs. ACS Materials Lett., May 2020, 2(7):671-684.
DOW. DOWSIL™ 8005 Waterborne Resin. Technical Data Sheet. Website, http://www.dow.com, originally downloaded Aug. 14, 2024, 3 pages.
DOW. Binders for Textile & Nonwoven Markets & Applications. Product Selection Guide. Website, http://www.dow.com, originally downloaded Aug. 14, 2024, 8 pages.
DOW. RHOPLEX™ HA-16. Technical Data Sheet. Website, http://www.dow.com, originally downloaded Aug. 14, 2024, 2 pages.
DOW. Acrylic Elastomeric Roof Coatings. Website, http://www.dow.com, originally downloaded Aug. 14, 2024, 4 pages.
DOW. RHOPLEX™ EC-1791 Emulsion. Technical Data Sheet. Website, http://www.dow.com, originally downloaded Aug. 14, 2024, 2 pages.
DOW. PARALOID™ B-48N Solid Grade Thermoplastic Acrylic Resin. Technical Data Sheet. Website, http://www.dow.com. originally downloaded Aug. 14, 2024, 2 pages.
DOW. RHOPLEX™ ST-954 Soft and Durable Acrylic Binder. Technical Data Sheet. Website, http://www.dow.com, originally downloaded Aug. 14, 2024, 5 pages.
Eastman. Butvar® B-76. Technical Data Sheet. Website, https://productcatalog.eastman.com/tds/ProdDatasheet.aspx?product=71095419&pn=butvar-b-76. Originally downloaded Jul. 16, 2024, 1 page.
Lubrizol, Carbotac™ 1811 Acrylic Emulsion. Product Data Sheet. Website, https://www.lubrizol.com, originally downloaded Aug. 14, 2024, 2 pages.
Univar Solutions, RHOPLEX™ EC-1791 Emulsion. Safety Data Sheet. Website, https://www.univarxolutions.com, originally downloaded Aug. 14, 2024, 10 pages.
Wacker. SILRES® MP 50 E. Silicone Resin Emulsions. Website, https://www.wacker.com. originally downloaded Aug. 14, 2024, 3 pages.
Aimjaijit et al. Synthesis of Silica Gel and Development of Coating Method for Applications in a Regenerative Air Dehumidifier. Applied Mechanics and Materials, Jun. 2016, 839:70-74.
Alcañiz-Monge et al. Water Adsorption on Activated Carbons: Study of Water Adsorption in Micro- and Mesopores. J. Phys. Chem. Jul. 2001, 105(33):7998-8006.
Brandani et al. Water Adsorption on AQSOA-FAM-Z02 Beads. J. Chem. Eng. Data, Jun. 2022, 67(7):1723-1731.
Dehnavi et al. Application of Acrylate Latex Emulsion as the Binder for Coating Aluminum Substrate by Silica-Gel Powder. International Journal of Air-Conditioning and Refrigeration, 2019, 27(4), 8 pages.
Goldsworthy. Measurements of water vapour sorption isotherms for RD silica gel, AQSOA-Z01, AQSOA-Z02, AQSOA-Z05 and CECA zeolite 3A. Microporous and Mesoporous Materials, Sep. 2014, 196:59-67.
Kayal et al. Adsorption characteristics of AQSOA zeolites and water for adsorption chillers. International Journal of Heat and Mass Transfer, Jan. 2016, 92:1120-1127.
Li et al. Binary Adsorption Equilibrium of Carbon Dioxide and Water Vapor on Activated Alumina. Langmuir, Sep. 2009, 25(18):10666-10675.
Lian et al. Extraordinary water adsorption characteristics of graphene oxide. Chem Sci., May 2018, 9(22):5106-5111.
Salame et al. Experimental Study of Water Adsorption on Activated Carbons. Langmuir, Jan. 1999, 15(2):587-593.
Yan et al. Water Adsorption and Surface Conductivity Measurements on α-Alumina Substrates. IEEE Transactions on Components, Hybrids, and Manufacturing Technology, Jun. 1987, 10(2):247-251.
Zheng et al. Recent progress on desiccant materials for solid desiccant cooling systems. Energy, Sep. 2014, 74(1):280-294.
Zhu et al. The Porosity and Water Adsorption of Alumina Pillared Montmorillonite. Journal of Colloid and Interface Science, May 1995, 171:377-385.

(56) References Cited

OTHER PUBLICATIONS

European Patent Application No. 21754205.9, Extended European Search Report mailed Apr. 19, 2024. 8 pages.
Singapore Patent Application No. 11202252723Y, Office Action mailed Oct. 31, 2024, 8 pages.
European Patent Application No. EP 19891188.5, Office Action dated Jan. 26, 2024, 7 pages.
European Patent Application No. EP 19891188.5, Response to Office Action filed Apr. 9, 2024, 14 pages.
Lu et al. Tuning the structure and function of metal-organic frameworks via linker design. Chemical Society Reviews, Jan. 2014, 43(16):5561-5593.

* cited by examiner

WATER HARVESTER

I. FIELD OF THE INVENTION

Sorbent compositions useful in the adsorption of water from a process fluid flow. In particular embodiments, the sorbent compositions can be disposed alone as a sorbent composition layer or can be disposed as a sorbent composition layer on a substrate material, either of which can be reconfigured as a plurality of structural components that are useful in the assembly water capture modules that can be disposed in an adsorption/desorption structure of a water harvester.

II. BACKGROUND OF THE INVENTION

Sorbents include materials that adsorb water from the atmosphere and desorb water from the sorbent consistent with a corresponding sorbent isotherm. Sorbents can be obtained as finely divided particles which need to be converted into sorbent compositions and form factors useful as structural components in the production of water harvesters. However, conventional dry sorbent compositions have a relatively low sorbent content of 30 weight percent ("wt. %") to 60 wt. % and/or the sorbent can have greater than 15 percent ("%") loss in water adsorption capacity within the dry sorbent composition. Additionally, conventional sorbent compositions must be applied to and may not be used as structural components discrete from a supporting substrate material. Moreover, current sorbent compositions may not sufficiently adhere to substrate materials or may not demonstrate sufficient elasticity on substrate materials to be reconfigured into structural components useful in the production of water capture modules used in water harvesters.

There would be a substantial advantage in sorbent compositions exhibiting a range of discrete isotherm steps each having a relatively high sorbent content in the dry sorbent composition of about 65 wt. % to about 85 wt. % with less than 15% loss in water adsorption capacity of the sorbent in the dry sorbent composition. Additionally, there would be a substantial advantage in sorbent compositions which can be disposed in sorbent layers useful as structural components without being applied to a substrate material. Moreover, there would be a substantial advantage in sorbent compositions which after application to a substrate material can be reconfigured into structural components useful in the assembly of water capture modules which can be disposed in the adsorption/desorption structure of a water harvester.

III. SUMMARY OF THE INVENTION

Accordingly, a broad object of particular embodiments of the invention can be provision of sorbent compositions useful in the production of sorbent panels including a sorbent composition layer, wherein the sorbent composition comprises: a sorbent of about 10 wt. % to about 60 wt. %, the sorbent having a water uptake capacity of about 0.2 grams water per gram of sorbent to about 2 grams of water per gram of sorbent, a polymer binder of about 5 wt. % to about 30 wt. %; and a solvent comprising the remaining wt. % of the sorbent composition, wherein said solvent dissolves or emulsifies the binder. In particular embodiments, each of the plurality of sorbent panels can comprise only the dry state of the sorbent composition layer. In particular embodiments, the sorbent composition layer can be disposed on one or both sides of a substrate material. In particular embodiments, the sorbent composition layer can be wound into a roll without the sorbent composition layer self-adhering in the roll.

Another broad object of the invention can be the production of water capture modules including a plurality of sorbent panels disposed in spatially fixed relation defining an fluid flow path between adjacent pairs of the plurality of sorbent panels, wherein each of the plurality of sorbent panels includes a sorbent composition disposed in a sorbent composition layer, wherein the sorbent composition includes at least: a sorbent of about 10 wt. % to about 60 wt. %, wherein said sorbent having a water uptake capacity of about 0.2 grams water per gram of sorbent to about 2 grams of water per gram of sorbent, a polymer binder of about 5 wt. % to about 30 wt. %, and a solvent comprising the remaining wt. % of the sorbent composition, wherein the solvent dissolves or emulsifies the binder and/or disperses the sorbent.

Another broad object of the invention can be the production of a water harvester including an adsorption/desorption structure, wherein a plurality of water capture modules can be disposed in the adsorption/desorption structure, and wherein the adsorption/desorption structure switches at least one water capture module from an adsorption mode in which the plurality of sorbent panels adsorb water from a process fluid flow passing through said water capture module to a desorption mode in which said plurality of sorbent panels desorb water into a heated fluid flow. In particular embodiments, the adsorption/desorption structure shifts at least one water capture module from a desorption mode in which said plurality of sorbent panels desorb water into a heated fluid flow passing through said water capture module to an adsorption mode in which the plurality of sorbent panels adsorb water from a process fluid flow. In particular embodiments, the adsorption/desorption structure shifts at least one water capture module to an adsorption sector of the adsorption/desorption structure and concurrently shifts at least one water capture module to a desorption sector of the adsorption/desorption structure. In particular embodiments, the adsorption/desorption structure includes a rotary structure in which the plurality of water capture modules are mounted, wherein the rotary structure rotates to move at least one of the plurality of water capture modules from a desorption sector to an adsorption sector of the adsorption/desorption structure, and concurrently moves at least one the plurality of water capture modules from an adsorption sector to a desorption section of the adsorption/desorption structure.

Naturally, further objects of the invention are disclosed throughout other areas of the specification, drawings, photographs, and claims.

IV. BRIEF DESCRIPTION OF THE DRAWINGS

V. DETAILED DESCRIPTION OF THE INVENTION

Generally, referring to FIGS. 1 through 10, the invention relates to inventive sorbent compositions (1), methods of making the sorbent compositions (1), and the use of sorbent compositions (1) in the production of structural components of a water harvester (2).

Figure 1:
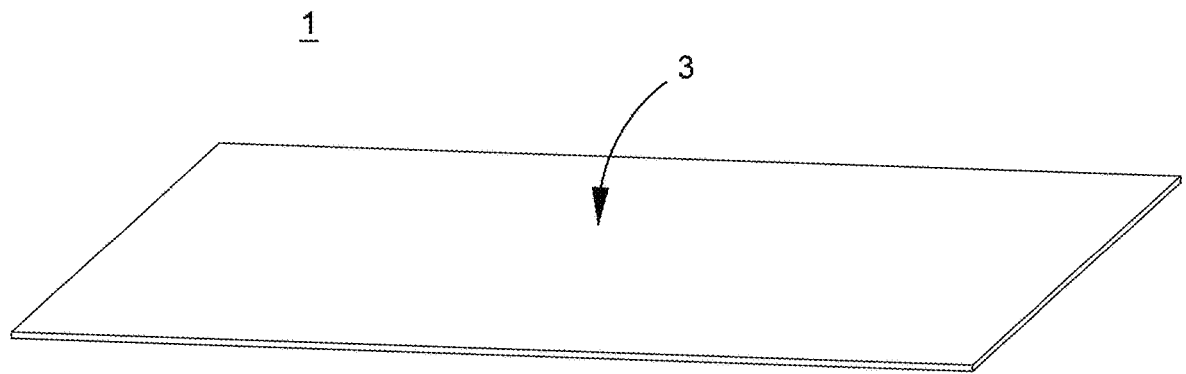
FIG. 1 is an illustration of a sorbent composition disposed in a sorbent composition layer.

Now, with primary reference to FIG. 1, in particular embodiments, a sorbent composition (1) in accordance with embodiments of the invention can be disposed in a sorbent composition layer (3) without application to a substrate material (4). The sorbent composition layer (3) alone and without application to a substrate material (4) can be used as a structural material useful in the production of structural components of a water harvester (2).

Figure 2:
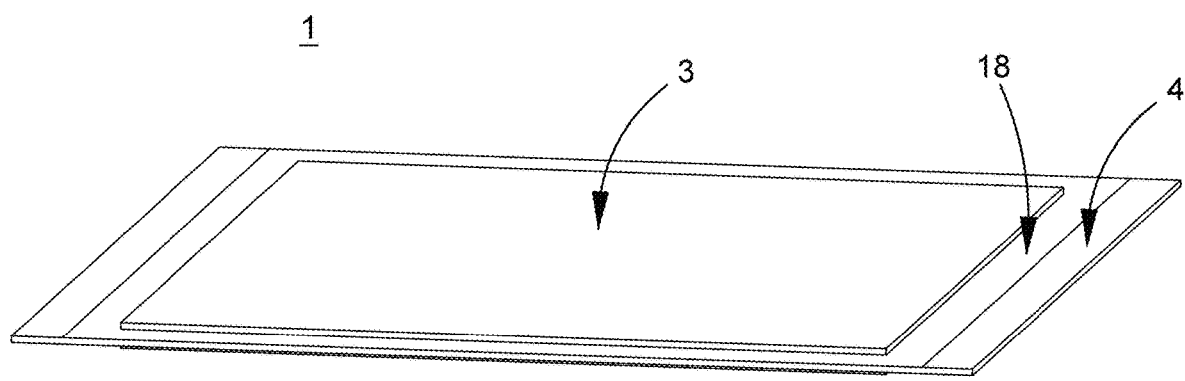
FIG. 2 is an illustration of a sorbent composition disposed in a sorbent composition layer on a substrate material.

Now, with primary reference to FIG. 2, in particular embodiments, a sorbent composition (1) in accordance with embodiments of the invention can be disposed as a sorbent composition layer (3) on a substrate material (4). The sorbent composition layer (3) applied to a substrate material (4) can be used as a structural material useful in the production of structural components of a water harvester (2).

Again, with general reference to FIGS. 1 and 2 and illustrative Examples I through IV below, embodiments of the inventive sorbent compositions (1) for deposition as a sorbent composition layer (3) whether alone or in combination with a substrate material (4) can contain one or more of: a solvent (5), a binder (6), a dispersant (7), a thickener (8), a plasticizer (9), a surfactant (10), and a sorbent (11).

Solvent. For the purposes of embodiments of the invention, a solvent (5) is a substance in which a binder (6) can be dissolved or emulsified, and the sorbent is dispersed, and without sacrificing the breadth of the foregoing, illustrative examples of solvents (5) include: water, ethyl acetate, ethyl alcohol, and combinations thereof.

Binders. In particular embodiments of the sorbent composition (1), a binder (6) can be used to retain sorbent (11) particles in a cohesive substance that can be disposed in a sorbent composition layer (3). A wide variety of binders (6), individually or in various permutations and combinations, can be useful in embodiments of the sorbent composition (1). Illustrative examples of binders (6) include: an acrylic resin, a silicone resin, an acrylate resin, an epoxy resin, an alkyd resin, a polyester resin, a vinylester resin, a melamine resin, a polyvinyl butyral (CAS No. 63148-65-2), a polyvinyl alcohol (CAS No. 9002-89-5), a carboxymethyl cellulose (CAS No. 9004-32-4), a hydroxypropyl methyl cellulose (CAS No. 9004-65-3), a polyurethane, a polyvinylidene fluoride (CAS No. 24937-79-9), Rhoplex™ EC 1791 (water, aqua ammonia, diphenyl ketone, acrylic polymers CAS No. 119-61-9), Rhoplex™ ST954 (water, acrylic polymers, formaldehyde), Rhoplex™ HA-16 (water, acrylic polymers, formaldehyde), Carbotac™ 1811, Acronal™ 4F (Polyacrylic acid n-butyl ester), Butvar™ B76 (polyvinyl butyral, polyvinyl alcohol, polyvinyl acetate, 2-ethyl-2-hexenal), DOWsil™ 8005 (silsesquioxanes, propyl, [(dimethylsilyl) oxy]-terminated, reaction products with polyethylene distillation residues CAS No. 9006-65-9), and Paraloid™ B48N (methyl methacrylate copolymer CAS No. 25086-15-1).

Dispersant. In particular embodiments of the sorbent composition (1), a dispersant (7) can be included to disperse the sorbent (11) in the sorbent composition (3). The dispersant (7) can influence the properties of the sorbent composition (1) as it relates to composition stability, sorbent particle distribution, smoothness, and finish of the sorbent composition layer (3). The dispersant (7) can further influence the performance of the sorbent composition layer (3) in regard to mitigating loss of water uptake capacity by the sorbent (11) in the sorbent composition (3) and in regard to water uptake capacity of the sorbent composition layer (3) per unit volume. As an illustrative example, the dispersant (7) can comprise one or more of: Tamol™ 851 (Na poly (methacrylic acid)), or Tamol™ 1124 (poly(methacrylic acid co-hydroxypropyl acrylate)) (Dow Chemical, Midland, Michigan), or Rhodoline™ 286N (ammonium polyacrylate copolymer, water, ammonium sulfate), Rhodia, Cranberry, N.J.), Disponil™ Fes-77 (a fatty alcohol polyglycol ether sulfate) (Cognis, Cincinnati, Ohio), Z-3 Blown menhaden fish oil (oxidatively polymerized fish oil), (Tape Casting Warehouse, Morrisville, Pennsylvania), a polybasic acid salts, such as a potassium tripolyphosphate, a polycarboxylic acid salts, a copolymer acid salts, an alkali soluble resin salt, a phosphoethyl methacrylate polymer, a mono or oligophosphorous or a sulfur containing acid salts, which can be organic or inorganic.

Thickener. In particular embodiments of the sorbent composition (1), a thickener (8) can be included as rheology modifier to control one or more of: shear rate, sag resistance, flow and deformation of the sorbent composition (1) either discrete from or as a sorbent composition layer (3) applied to a substrate material (4). As an illustrative examples, the thickener (8) can comprise one or more of: a carboxymethylcellulose, a methylcellulose, a hydroxypropyl methylcellulose, a hydroxyethylcellulose, an ethyl cellulose, METHOCEL™ A4M (a medium molecular weight hydroxypropylmethylcellulose CAS No. 9004-67-5).

Plasticizer. In particular embodiments of the sorbent composition (1), a plasticizer (9) can be included to improve the elasticity, flexibility, durability, and toughness of the sorbent composition layer (3). The plasticizer (3) can act to reduce the forces between molecules in the sorbent composition (1) to lower the glass transition temperature ("Tg") of the sorbent composition (1). As illustrative examples, the plasticizer (9) can comprise one or more of: a di-isononyl phthalate, a di-isodecyl phthalate, a di-2-ethyl hexyl phthalate, a di-n-octyl phthalate, a dioctyl adipate, an acetyl tri-butyl citrate, UCON™ 50-HB-2000 (Polyalkylene glycol monobutyl ether CAS No. 9038-95-3 Dow, Midland Michigan).

Surfactant. In particular embodiments of the sorbent composition (1), a surfactant (1) can be included to prevent or reduce flocculation or aggregation of suspended particles in the sorbent composition (1). A surfactant admixed in the sorbent composition (1) can weakly coordinate with particles in the sorbent composition (1) and sterically block particles from coming into contact with each other. Non-ionic surfactants (10) can comprise one or more of: ethoxylates and alkoxylates, and as illustrative examples, a secondary ethoxylated alcohol, a polyethylene glycol stearate, a lauryl alcohol ethoxylate, a sorbitan ester, s lauryl glucoside, a polyoxyethylene alkyl ethers, a fatty alcohol ethoxylate, an alkyl phenol ethoxylate, a fatty acid alkoxylate, Triton™ X-100 (p-tert-octylphenoxy)polyethoxyethanol (CAS NO. 9036-19-5). In particular embodiments, the surfactant can comprise an anionic surfactant (10). As illustrative examples, the anionic surfactant (10) can comprise one or more of: ammonium lauryl sulfate (CAS 2235-54-3), disodium cocoamphodiacetate (CAS 68650-39-5), a sodium lauroyl sarcosinate (CAS 137-16-6). In particular embodiments, the surfactant can comprise a cationic surfactant (10). As illustrative examples the cationic surfactant (10) can comprise one or more of: alkylimidazolines, alkoxylated amines, cetrimonium bromide (CAS 57-09-0), and benzalkonium chloride (CAS 8001-54-5). In particular embodiments, the surfactant (10) can comprise an amphoteric/zwitterionic surfactant (10). As illustrative examples, an amphoteric/zwitterionic surfactant can comprise one or more of: cocamidopropyl hydroxysultaine (CAS 68139-30-0), and cocamidopropyl betaine (CAS 61789-40-0).

Sorbents. A wide variety of sorbents (11), individually or in various permutations and combinations, can be used in embodiments of the sorbent compositions (1). As illustrative examples: a silica gel (CAS NO. 112926-00-8), silica gel types A, B, C and RD; a molecular sieve 3A, 4A, 5A, and 13X; a silicoaluminophosphate zeolite, such as SAPO-34 (CAS No. 1318-02-1), Y-Type zeolite (CAS NO. 1318-02-1); an alumina (CAS No. 1344-28-1); a graphene oxide (CAS No. 1034343-98-0); activated carbon (CAS No. 7440-44-0); a tetraethylammonium hydroxide TiAPSO-5 (tetraethylammonium hydroxide); FAPO-36 (ferroaluminophosphate zeolite); a metal-organic framework ("MOF"), such as MOF-303: Al(OH)(HPDC), where HPDC is 1H-pyrazole-3,5-dicarboxylate; MOF 313: Al(OH(PZDC) where PZDC is pyrrole-2,5-dicarboxylate; MOF 801: Zr 6O4 (OH)4 (fumarate) 6; CAU-10: Al(OH)(IPA), where IPA is isophthalate; MOF-801: $Zr_6O_4(OH)_4$ (fumarate)$_6$; CAU-23: Al(OH)(TDC) where TDC is 2,5-thiophenedicarboxylate; MOF-841: $Zr_6O_4(OH)_4(MTB)_6(HCOO)_4(H_2O)_2$; MOF-UIO-66 (CAS No. 1072413-89-8); Basolite A520: Al(OH) (fumarate); Basolite C300 (CAS NO. 688614; MIL100: $Fe^{III}_3O(H_2O)_2F\{C_6H_3(CO_2)_3\}_2nH2O$; MIL-160: Al(OH) (FDA), where FDA is 2,5-furandicarboxylate; MIL-53: Al(OH)(TPA), where TPA is terephthalate; or Aluminum Phosphate: AlPO4-LTA; COF-432 (1,3,5-triformylbenzene and 2,3,6,7,10,11 hexaoxatriphenylene); COF-300 (tetra-(4-anilyl)-methane and terephthaldehyde); COF 670 (Indo-5-carbocyanine N-ethyl-N'-hexanoic hydroxsuccinimide ester); COF-480 (2,3,6,7,10,11-hexaoxa-triphenylene and 1,3,5-benzenetricarboxylic acid); COF-482 (1,3,6,8-tetrakis (p-formylphenyl)pyrene and linear hydrazine); AB-COF (1,3,5-benzenetrialdehyde and linear hydrazine); Py-COF-2D (1,3,6,8-tetrakis(p-formylphenyl)pyrene and linear hydrazine). See also: H. Furukawa et al., *Water Adsorption in Porous Metal-Organic Frameworks and Related Materials*, J. Am. Chem. Soc. 2014, 136, 11, 4369-4381. MOFs are characterized by high water uptake and step-like characteristics for water uptake versus relative humidity ("RH"). In some variations, suitable sorbents (11), including MOFs, can have such an isotherm step, which can be tailored to various climates. See for example: International Patent Publication No. WO2020112899, Multivariate and Other Metal-Organic Frameworks, and Uses Thereof. The step isotherm can enable water capture and release by MOFs in a very narrow range of relative humidity ("RH"). Sorbents (11) can include a wide range of particle size, and useful embodiments of the sorbent composition (1) can be prepared with particle sizes in the range 0.5 nanometers ("nm") to 250 micrometer ("μm").

Substrate Material. In particular embodiments, the sorbent composition (1) can, but need not necessarily, be applied to a substrate material (4). Various factors can be balanced in the selection of the substrate material (4) including, one or more of: sorbent composition (1) adhesion to the substrate material (4), the mechanical strength of the substrate material (4), the thermal penalty of the substrate material (4), the malleability of the substrate material (4), and cost of the substrate material (4). As an illustrative example, sorbent compositions (1) adhere well to aluminum foil which can be obtained in a thickness range of about 5 micrometer ("μm") to about 80 μm; however, in particular embodiments aluminum foil thickness below 10 μm may have insufficient mechanical strength while aluminum foil thickness above 20 μm may attract a substantial a heat penalty. Accordingly, in particular embodiments, an aluminum foil having a thickness of about 12 μm to 20 μm can be useful as a substrate material (4) on which sorbent compositions (1) can be applied and subsequently used in the production of structural components for water capture modules (13). This illustrative example is not intended to preclude embodiments of the sorbent compositions (1) from being disposed on other woven, non-woven, or continuous substrate materials (4), including as illustrative examples: a copper, an aluminum including but not necessarily limited to grades 1100H28, 1060H28, 3003H28, a stainless steel 304, a stainless steel 316, a polyimide, a polyester, a polyethylene, a polypropylene, a polyvinyl chloride, a polysulfone, a cellulose, a fiberglass, and combinations thereof. In particular embodiments, the sorbent composition (1) can be applied in a sorbent composition layer (3) to a silicone or polytetrafluoroethylene substrate material (4). The sorbent composition layer (3) does not adhere to these substrate materials (4) and can be peeled off to provide a sorbent composition layer (3) which can be used without a substrate material (4) as structural components in the assembly of water capture modules (13) for use in a water harvester (2). Alternatively, the sorbent compositions (1) can be laid down to build up sorbent composition layers (3) by a 3D printer to form in part or in whole a water capture module (13) free of any substrate material (4).

Enablement. The above list of components can be combined in various combinations and permutations in view of the example sorbent compositions (1) provided herein without undue experimentation to produce a wide variety of useful sorbent compositions (1) for use in the assembly of water capture modules (13) for water harvesters (2). Particular sorbent compositions (1) in accordance with embodiments of the invention, comprise, consist essentially of, or consist of a solvent (5), a binder (6), and a sorbent (11).

The sorbent (11) can comprise any of the above listed sorbents or any other sorbent (11) having a high-water uptake capacity. A useful range of sorbent water uptake capacity can be about 0.2 grams per gram of sorbent to about 2 grams per gram of sorbent. The weight percent of sorbent

(11) in the initial wet sorbent composition (1) can be calculated to achieve a weight percent of the sorbent (11) in the final dry sorbent composition layer (3) of about 75 wt. % to about 85 wt. %. This weight percent of sorbent is substantially greater than the weight percent of sorbent in conventional dry coatings which include sorbent of about 30 wt. % to about 60 wt. %. In the initial wet sorbent composition (1), the sorbent (11) can comprise about 10 wt. % to about 60 wt. %. The term "wet sorbent composition" for the purposes of this invention means the initial liquid state of the sorbent composition prior to evaporation of solvents. The term "dry sorbent composition" for the purposes of this invention means the final cured state of the sorbent composition.

The binder (6) glass transition temperature ("Tg") can be a key parameter that dictates the properties and performance of the dry sorbent composition layer (3). Above the Tg of the binder (6), the binder (6) polymer behaves more like a fluid, resulting in a flexible or elastic sorbent composition layer (3). Below the Tg of the binder (6), the binder (6) polymer behaves like an amorphous solid (a glass) resulting in a hard or brittle sorbent composition layer (3). Lower Tg results in a more flexible sorbent composition layer (3). Higher Tg results in a less flexible sorbent composition layer (6). The Tg of the sorbent composition layer (3) can be controlled by selecting a binder (6) with a specific Tg, or by blending similar, compatible binders with different Tg (for example, a low Tg acrylic mixed with a high Tg acrylic to achieve an effective Tg in between the two). As illustrative examples, binders having relatively low Tg include: Rhoplex™ EC 1791, Rhoplex™ ST954, Carbotac™ 1811, Acronal™ 4F, Silres™ MP50E, and DOWsil™ 8005, and combinations thereof. As illustrative examples, binders having relatively high Tg include: Paraloid™ B48N, Butvar™ B76, and Rhoplex™ HA-16, and combinations thereof.

The exact Tg of the final dry sorbent composition layer (3) need not be exactly measured to identify useful sorbent compositions (1) and corresponding useful properties of the dry sorbent composition layers (3). Sorbent composition layers (3) having a relatively low Tg can be rolled, unrolled, and formed into complex geometries without cracking, flaking, or delaminating from a substrate material (4). In particular embodiments, the sorbent composition layer (3) can be rolled or wrapped multiple times around itself or on a tube. In particular embodiments, the dry composition layer (3) whether alone or disposed on a substrate material (4) can be corrugated or formed into other geometries to increase the sorbent composition layer surface area per unit volume of a water capture module (13).

If a planar geometry of the dry sorbent composition layer (3) is desired, then a high Tg formulation can be used to assemble water capture modules (13) containing flat sorbent composition layers (3). Additionally, Tg influences dirt pickup resistance. At relatively high Tg (harder sorbent composition layers (3)), dirt, oil, soils, are less likely to remain on the dry sorbent composition layer (3) and can be more suitable for austere environments with infrequent maintenance. Low Tg (softer sorbent composition layers (3)) can be more suitable for clean environments where dust is not present, such as clean rooms or manufacturing environments.

In particular embodiments, certain binders (6), such as silicones, do not undergo a glass phase transition. However, these binders (6) still behave in a similar fashion as other polymers that do undergo glass transitions and similar considerations apply in performance of the dry sorbent composition layer (3). For example, sorbent compositions (1) formulated with silicone binders (6) can be flexible (as in Example Sorbent Composition 2) or be hardened by adding a crosslinking agent such as N-(2-aminoethyl)-3-aminopropylsilanetriol. In the initial wet sorbent composition (1), the binder (6) can comprise about 5 wt. % to about 30 wt. %.

In particular embodiments, a plasticizer (9) can be blended with the binder (6) to reduce Tg of a binder (6). As an illustrative example, a polyalkylene glycol can be blended with a polyacrylate to reduce the Tg of the binder (6). In particular embodiments, a crosslinking agent can be blended with the binder (6) to crosslink binder polymers to increase Tg. As illustrative examples, a benzophenone can be used to catalytically crosslink acrylics present in some acrylic formulations, such as Rhoplex™ EC-1791, while N-(2-aminoethyl)-3-aminopropylsilanetriol can be used with silicone binders (6). In the initial wet sorbent composition (1), the plasticizer (9) can comprise about 1.0 wt. % to about 8.0 wt. %.

In particular embodiments, particular embodiments of the sorbent composition (1) can further include a thickener (8) to control the flow and deformation of the sorbent composition (1) depending on the application. Depending on the method of applying the sorbent composition (1) to a substrate material (4), the viscosity of the sorbent composition (1) can be controlled by addition of the thickener (8). As an illustrative example, if the method of applying the sorbent composition (1) to the substrate material (4) comprises roll-to-roll coating then the surface tension, viscosity and density of the sorbent composition (1) are factors that determine the sorbent composition layer (3) thickness and too low a viscosity can result in leakage from the equipment. For transfer roll coaters the viscosity of the sorbent composition (1) can be about 900 centipoise ("cps") to about 10,000 cps (about 0.9 Pascal-second ("Pa·s") to about 10.0 Pa·s). In the initial wet sorbent composition (1), the thickener can comprise about 0.25 wt. % to about 5.0 wt. %.

In particular embodiments, the sorbent composition (1) can further include a dispersant (7) to reduce settling and aggregation of the sorbent particles to uniformly distributed sorbent particles throughout the sorbent composition (1) and the sorbent composition layer (3). The uniform distribution of the sorbent particles can increase water uptake capacity of the sorbent composition layer (3) per unit volume and reduce irregularities in the sorbent composition layer (3). In the initial wet sorbent composition (1), the dispersant (7) can comprise about 0.25 wt. % to about 5.0 wt. %.

In particular embodiments, the sorbent composition (1) can further include a surfactant (10) to prevent or reduce flocculation or aggregation of suspended particles in the sorbent composition (1). The anionic, cationic, amphoteric, non-ionic surfactants (10) alone or in combinations can be admixed in the sorbent composition (1) to weakly coordinate with particles in the sorbent composition (1) and sterically block particles from coming into contact with each other. Non-ionic surfactants (10) can comprise about 0.25 wt. % to about 3.00 wt. %.

In particular embodiments, the sorbent composition (1) can further include a colorant (15) to afford a perceptible change in color based on an amount of water (14) adsorbed by the sorbent (11) or sorbent composition layer (3). Colorants may be added to distinguish between different sorbent compositions. A colorant can comprise a dye or a pigment. As illustrative examples, sorbents (11) including but not limited to silica gels can be impregnated with one or more of: cobalt(II) chloride which changes from blue to pink, cobalt chloride mixed with zinc chloride, and can further include one or more colorants, such as: FD&C #1 orange, FDXzC #1 yellow, FD&C #3 green, FD&C #1 red, FD&C #5 yellow, and FD&C #6 yellow, and FD&C #1 Blue. In the initial wet sorbent composition (1), the colorant (15) can comprise about 0.1 wt. % to about 1.0 wt. %.

The solvent (5) can make up the remaining wt. % of the initial wet sorbent composition (1).

Now, with general reference to FIGS. 1 through 11, embodiments of the sorbent compositions (1) and sorbent composition layers (3) can be prepared by persons of ordinary skill in the art without undue experimentation to afford one or more properties useful for the assembly of water capture modules (13) that can be disposed within an adsorption sector (16) or a desorption sector (17) of a water harvester (2). Suitable sorbent compositions (1), whether or not associated with a substrate material (4), can be disposed in a sorbent composition layer (3) having thickness of about 160 μm to about 350 μm (with incremental increase in layer thickness of about 20 μm within the range) to achieve a desired water uptake per square centimeter of the sorbent composition layer (3) of about 3 milligrams ("mg") $H_2O/cm^2$ to about 7.5 mg $H_2O/cm^2$ or with substrate materials (4) having sorbent composition layers (3) on both sides about 6 milligrams $H_2O/cm^2$ to about 15 mg $H_2O/cm^2$). The sorbent (11) in a dry sorbent composition layer (3) can exhibit a loss of sorbent water uptake capacity of less than 15% as compared to the raw sorbent material. The sorbent material can remain substantially chemically and physically stable having undergone ten temperature cycles each comprising one hour at room temperature and one hour at about 130° C. (about 266° F.). In particular embodiments, the sorbent composition layer (3), whether discrete from a substrate material (4) or disposed on a substrate material (4), can be wound upon itself or around a tube into a roll (21) in which the sorbent composition layers (3) do not self-adhere and allows the rolled sorbent composition layers (3) to be stored in a compact form factor of a roll (21) and unwound for use in the production of structural components for water harvesting modules (13). In particular embodiments, the sorbent composition layers (3) do not crack, flake, or delaminate from the substrate material (4) during the production of structural components for water capture modules (13) or during operation of the water harvester (2). In particular embodiments, the sorbent composition layers (3) can be folded upon themselves without cracking, flaking, or delaminating from a substrate material. In particular embodiments, the sorbent composition (1) and the sorbent composition layer (3) can exhibit a combination of some or all of the above listed properties. Once the sorbent composition (1) or sorbent composition layer (3) exhibits the desired properties, the sorbent composition (1) formula can be scaled to meet the demand.

The following illustrative examples of sorbent compositions (1) can be useful in the production of a sorbent composition layer (3) discrete from a substrate material (12) or disposed as a sorbent composition layer (3) on a substrate material (12), and which can be reconfigured into one or a plurality of structural components useful in the assembly water capture modules (13) disposed within an adsorption sector (16) and/or the desorption sector (17) of a water harvester (2).

| Component | Mass Fraction/wt. % | Function |
|---|---|---|
| EXAMPLE I. | | |
| Water | 44.04% | Solvent (5) |
| Silica gel Type A | 34.15% | Sorbent (11) |
| Rhoplex ™ EC 1791 | 20.78% | Binder (6) |
| Tamol ™ 851 | 0.68% | Dispersant (7) |
| Methocel ™ E4M | 0.34% | Thickener (8) |
| EXAMPLE II. | | |
| Water | 63.70% | Solvent (5) |
| MOF 303 | 22.41% | Sorbent (11) |
| DOWsil ™ 8005 | 12.97% | Binder (6) |
| Yellow Dye | 0.68% | Colorant (15) |
| Methocel ™ E4M | 0.25% | Thickener (8) |
| EXAMPLE III. | | |
| Ethyl acetate | 38.31% | Solvent (5) |
| SAPO-34 | 35.30% | Sorbent (11) |
| Ethanol 99% | 16.67% | Co-solvent (5) |
| Paraloid ™ B48N | 7.09% | Binder (6) |
| UCON ™ 50-HB-2000 | 2.13% | Plasticizer (9) |
| Z-3 Blown menhaden fish oil | 0.50% | Dispersant (7) |
| EXAMPLE IV. | | |
| Water | 46.07% | Solvent (5) |
| SAPO-34 | 31.13% | Sorbent (11) |
| Rhoplex ™ HA-8 | 20.44% | Binder (6) |
| Tergitol ™ 15-S-40 | 1.34% | Surfactant (10) |
| Methocel ™ E4M | 0.62% | Thickener (8) |
| Red Pigment | 0.39% | Colorant |

These Examples I through IV are not intended to preclude other embodiments of the sorbent composition (1), but rather are intended to provide the person of ordinary skill in the art sufficient information in view of the description and figures to make a numerous wide variety of embodiments of the invention.

Now, with primary reference to FIG. 2, sorbent compositions (1) encompassed by the invention can be applied to a substrate material (4). The method of application can vary and take the form of one or more of the following examples: manual application with a brush or a roller, dip coating, roll-to-roll coating, spread coating, slot die coating, cathodic dip coating, air knife coating, powder coating, and spray coating.

In particular embodiments, a primer layer (18) may have to be applied to certain substrate materials (4) to bond the sorbent composition (1) to the substrate material (4). A primer layer (18) can comprise, consist essentially of, or consist of the binder (6) or the binder (6) including only sufficient additives to allow the method of application. The primer layer (18) can comprise a primer layer thickness of 5 μm to about 20 μm. The primer layer (18) can be limited in thickness to correspondingly reduce the associated thermal penalty. In particular embodiments, no primer layer (18) is required.

Figure 3:
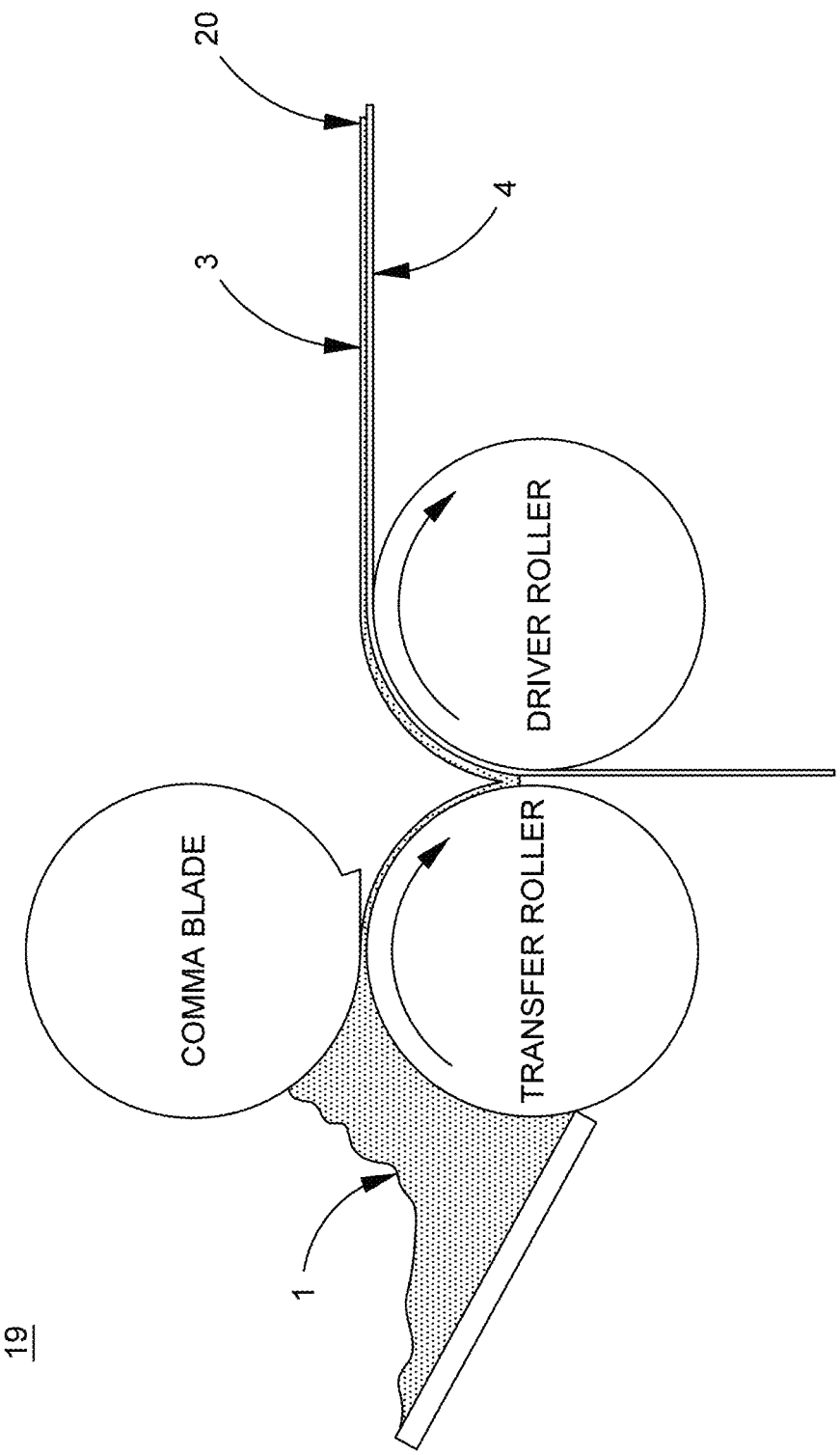
FIG. 3 is an illustration of a method of producing a sorbent composition layer on a substrate material using roll-to-roll coating equipment.

Now, with primary reference to FIG. 3, in particular embodiments, roll-to-roll coating equipment (19) can be used with a sorbent composition (1) to generate a sorbent composition layer (3) on one or both sides of a generally flat substrate material (4). As an illustrative example, both sides of an aluminum foil having a thickness of about 10 μm to about 30 μm can be coated with a sorbent composition layer (3) having a thickness of about 100 μm to about 300 μm by the roll-to-roll coating equipment (19). The resulting dry sorbent material (20) can be wound into a roll of sorbent material (21) for storage and subsequent use.

Figure 4:
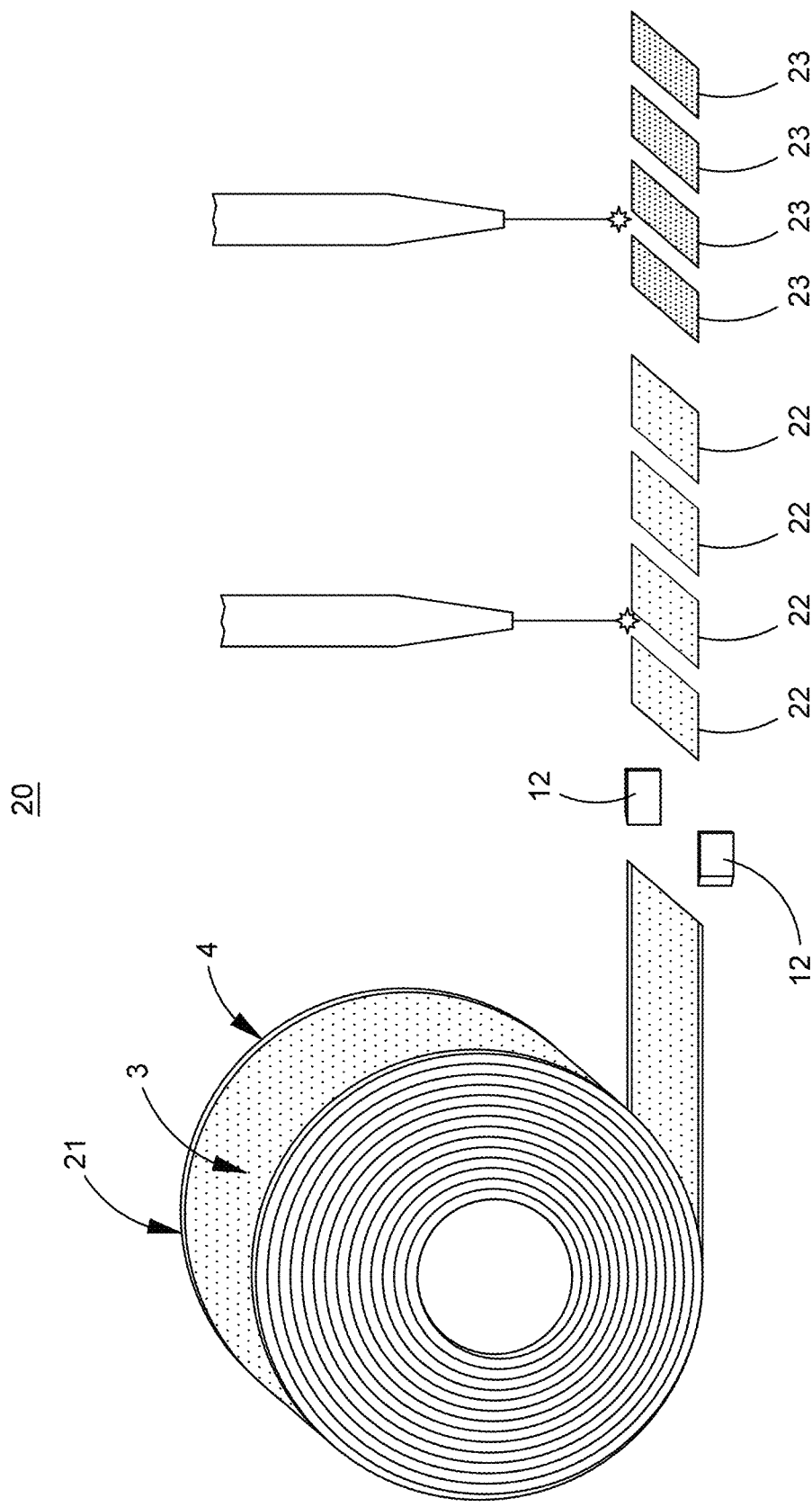
FIG. 4 is an illustration of a particular embodiment of the sorbent composition layer wound in a roll which can be unwound and subsequently cut into sorbent panels for the production of water capture modules for use in embodiments of a water harvester.

Now, with primary reference to FIG. 4, a sorbent material (20) can be unwound from the roll of sorbent material (21)

can be slit to trim the uncoated edges off the sorbent material (20). As examples, the slitter (12) can comprise wheel cut slitter or a blade cut slitter. The trimmed sorbent material (21) can then be cut into discrete sorbent material sheets (22). The sorbent material sheet (22) can then be cut using successive guillotine cuts, die cuts (rotary or press dies), laser cuts, or water jet cuts to obtain a final configuration of a sorbent panel (23) for assembly into a water capture module (13).

Figure 5:
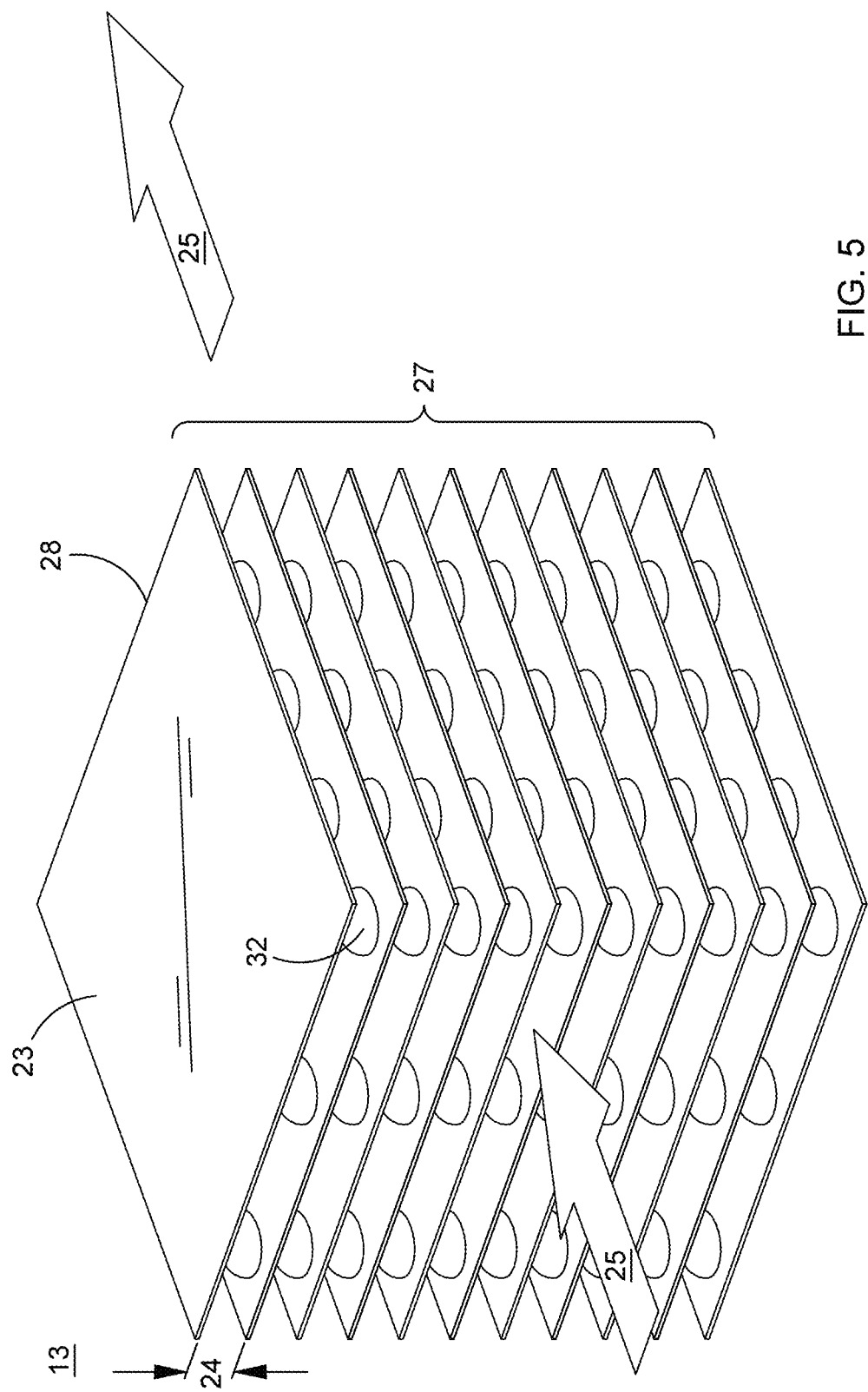
FIG. 5 is a perspective view of a particular embodiment of a water capture module including a plurality of flat sorbent panels disposed in stacked spaced apart relation to form a rectangular prism.
Figure 6:
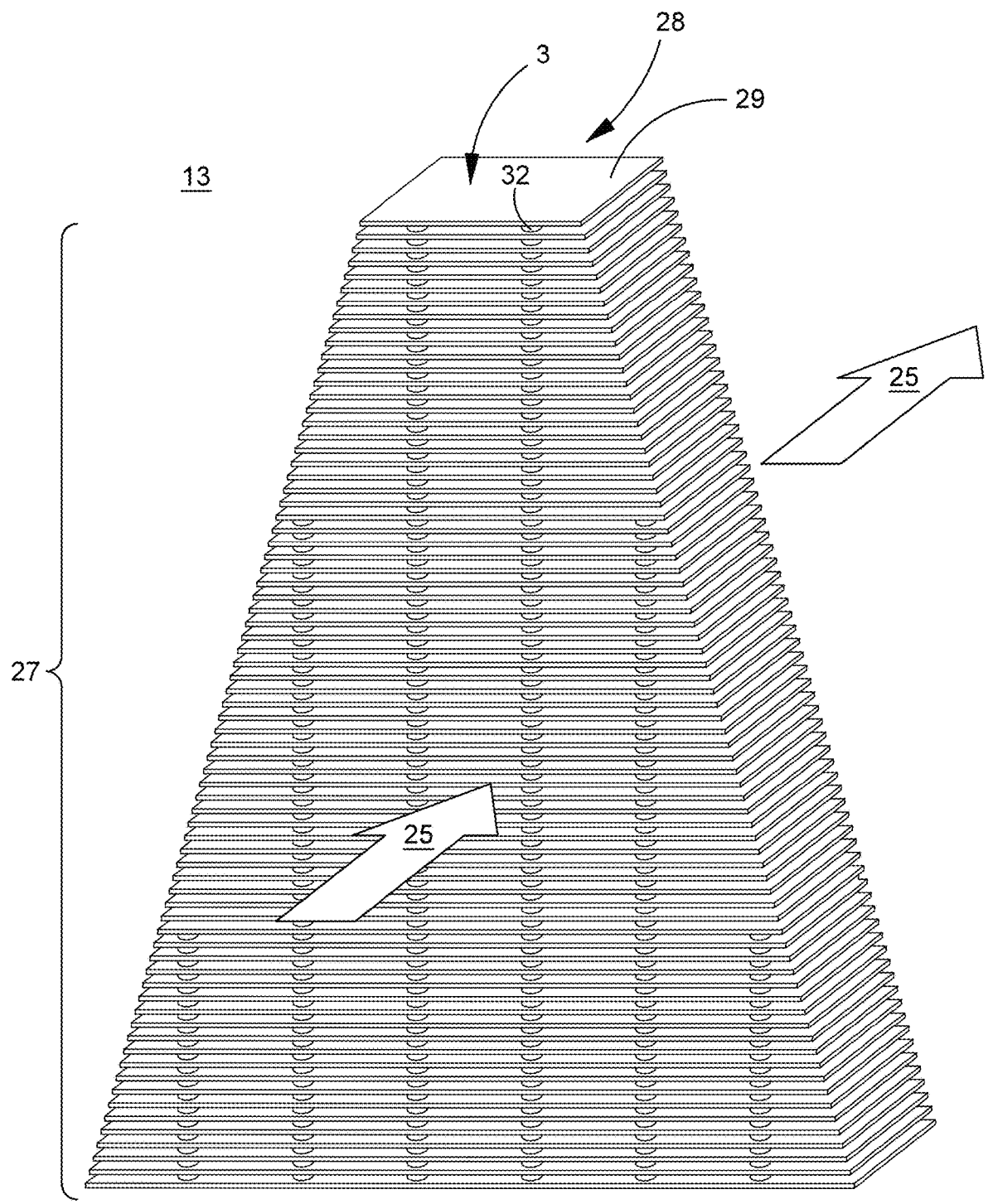
FIG. 6 is a perspective view of a particular embodiment of a water capture module including a plurality of flat sorbent panels disposed in stacked spaced apart relation to form a truncated rectangular pyramid.

Now, with general reference to FIGS. 5 and 6, embodiments of the water capture module (13) used in water harvesters (2) can comprise a plurality of sorbent panels (23). In particular embodiments, a plurality of sorbent panels (23) can be stacked in adjacent fixed spatial relation to each other with a distance (also referred to as "a gap") (24) between adjacent sorbent panels (23). The distance between adjacent sorbent panels (23) relative to the sorbent panel length and the sorbent panel width can be adjusted to achieve a fluid flow (25) of one or a mixture of gases, including but not limited to, atmospheric gases between adjacent sorbent panels (23) that increases the rate of water adsorption and/or increases the rate of water desorption by the water capture module (13).

Now, with primary reference to FIG. 5, in certain variations, each of a plurality of sorbent panels (23) in a stack of sorbent panels (27) can extend to a sorbent panel perimeter (28) defining the same or substantially the same sorbent panel configuration of the plurality of sorbent panels (23). The plurality of sorbent panels (23) having the same or substantially the same sorbent panel configuration can be stacked with alignment of the sorbent panel perimeters (28). The sorbent panels (23) having the same or substantially the same sorbent panel configuration are stacked with alignment of the sorbent panel perimeters (28) resulting in a water capture module (13) in the form of a rectangular prism.

Now, with primary reference to FIG. 6, in certain variations, the plurality of sorbent panels (23) can be configured with successively less sorbent panel area (29) and stacked to achieve a water capture module (13) in the form of a truncated rectangular pyramid. However, these illustrative examples of FIGS. 5 and 6 are not intended to preclude other configurations of the water capture module (13) which are consistent with the structure and function of the water harvester (2).

Figure 7:
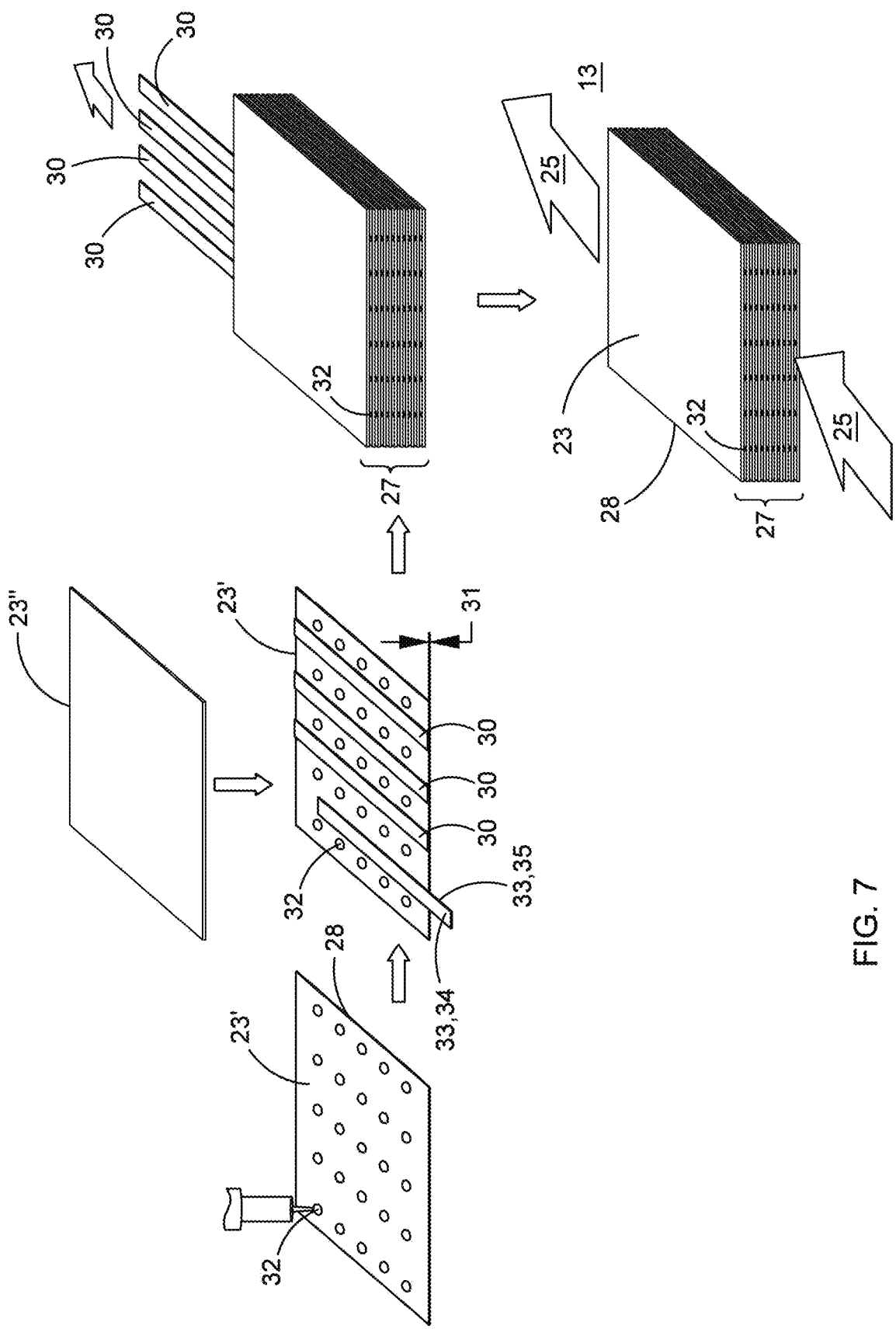
FIG. 7 is an illustration of a particular method of producing a water capture module.

Now, with primary reference to FIG. 7, a particular method of producing a water capture module (13) having a plurality of flat sorbent panels (23) disposed in general parallel adjacent spaced relation can include: obtaining a plurality of flat sorbent panels (23) each extending to a sorbent panel perimeter (28) having a configuration that when stacked in generally parallel adjacent spaced relation affords the final configuration of the water capture module (13). The term "flat" means generally flat to satisfy the distance between sorbent panels (23) when assembled to achieve a desired fluid flow (25). The method can further include disposing spacer plates (30) on a first sorbent panel (23') of a plurality of sorbent panels (23). The spacer plates (30) can have a spacer plate thickness (31) equivalent to the distance (24) to be maintained between the first sorbent panel (23') and an adjacent second sorbent panel (23") to achieve a fluid flow (25) between adjacent sorbent panels (23', 23") that allows for a determined rate of water adsorption and a determined rate of water desorption by the water capture module (13). The distance (24) between sorbent panels can be adjusted to offset the impediment to fluid flow (25) between adjacent sorbent panels (23', 23") associated with components used secure the adjacent panels in fixed spatial relation to one another.

Again, with primary reference to FIG. 7, in particular embodiments, amounts of adhesive (32) can disposed in spaced relation on the first sorbent panel (23') about the spacer plates (30). The second sorbent panel (23") can be pressed into contact with the amounts of adhesive (32) to engage the second sorbent panel (23") with the spacer plates (30). The method can be repeated to achieve a sorbent panel stack (27) in the configuration of the water capture module (13). The amounts of adhesive (32) can be allowed to cure and the spacer plates (30) removed resulting in a water capture module (13) useful for assembly into a water harvester (2). In particular embodiments, the spacer plates (30) can have a spacer plate adhesive layer (33) disposed on opposite spacer plate sides (34, 35). The spacer plates (30) can be disposed in spaced relation on the first sorbent panel (23'). Each spacer plate (30) can have thickness equivalent to the distance (24) to be maintained between the first sorbent panel (23') and an adjacent second sorbent panel (23"). The method can be repeated to achieve a sorbent panel stack (27) in the configuration of the water capture module (13). Various adhesives can be used in the assembly of a plurality of sorbent panels including waterproof sealants. Sealants typically include a polymer, a crosslinking agent, a filler, a catalyst and other additives. Illustrative examples of sealants include: acrylic sealants, polyurethane sealants, silicone sealants, and combinations thereof. In particular embodiments, the adhesive can comprise a pressure sensitive material with adhesive on both sides, wherein the thickness of the material can be selected to provide the desired gap between each pair of sorbent panels. These illustrative examples of assembling a plurality of sorbent panels (23) are not intended to preclude alternate methods of assembling a plurality of sorbent panels (23). Rather, these illustrative methods are intended to afford the person of ordinary skill sufficient examples to use achieve a numerous and wide variety of configurations of water capture modules (13).

Figure 8:
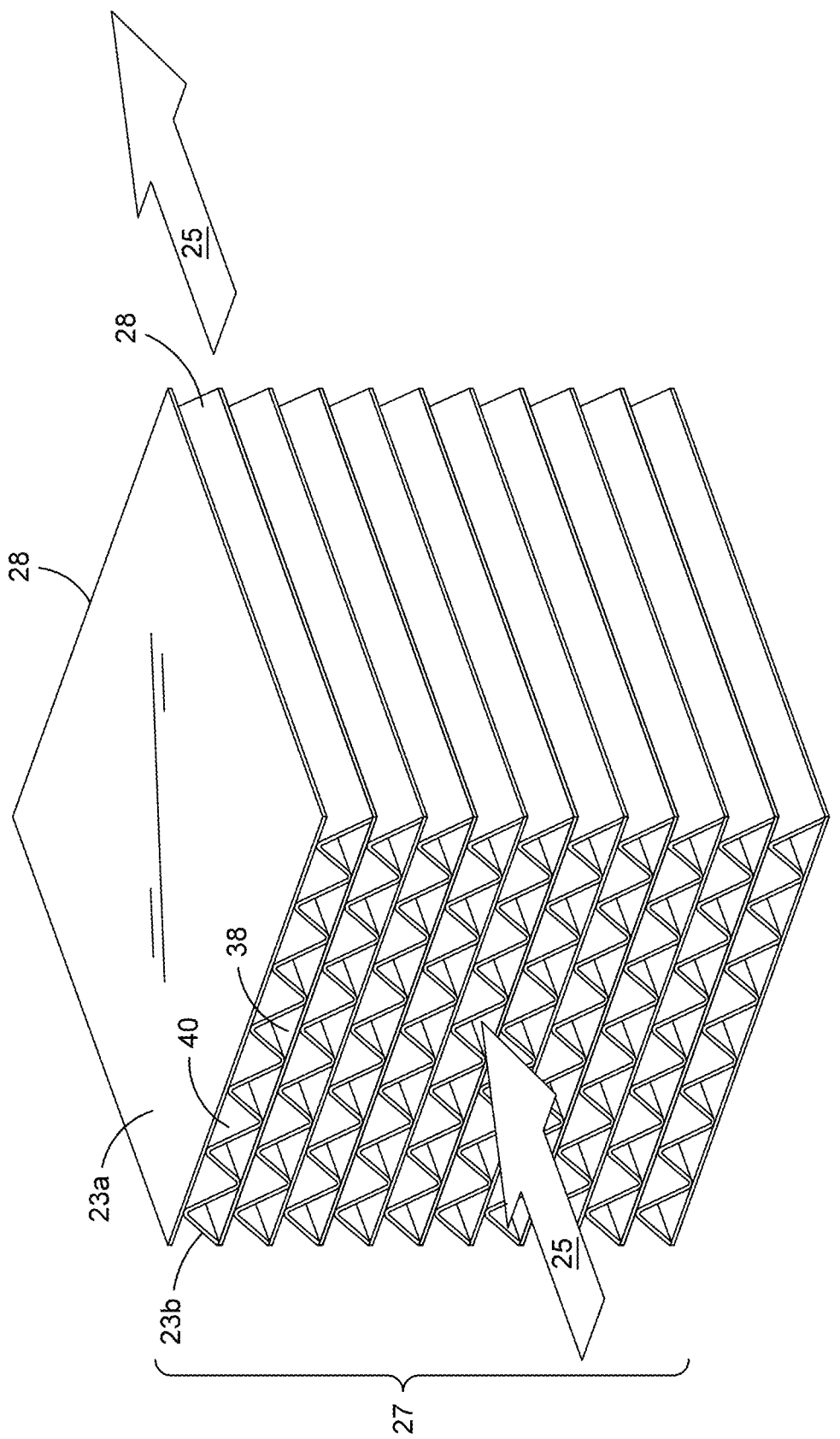
FIG. 8 is a perspective view of a particular embodiment of a water capture module including flat sorbent panels and corrugated sorbent panels disposed in alternating stacked relation to form a rectangular prism.

Now, with primary reference to FIG. 8, a particular method of producing a water capture module (13) having a plurality of sorbent panels (23) disposed in adjacent spaced relation can include one more of: obtaining a plurality of flat sorbent panels (23a) and obtaining a plurality of corrugated sorbent panels (23b) each extending to a sorbent panel perimeter (28). In particular embodiments, the sorbent panel perimeter (28) can have a configuration that when stacked in alternating adjacent relation of a flat sorbent panel (23a) and a corrugated sorbent panel (23b) affords the final configuration of the water capture module (13). The term "corrugated" means shaped into alternate ridges and valleys which can be defined by straight or curved faces. The term "flat" means a sufficiently flat to engage the ridged surface of a corrugated sorbent panel. The plurality of flat sorbent panels (23a) can be produced as above described.

Figure 9:
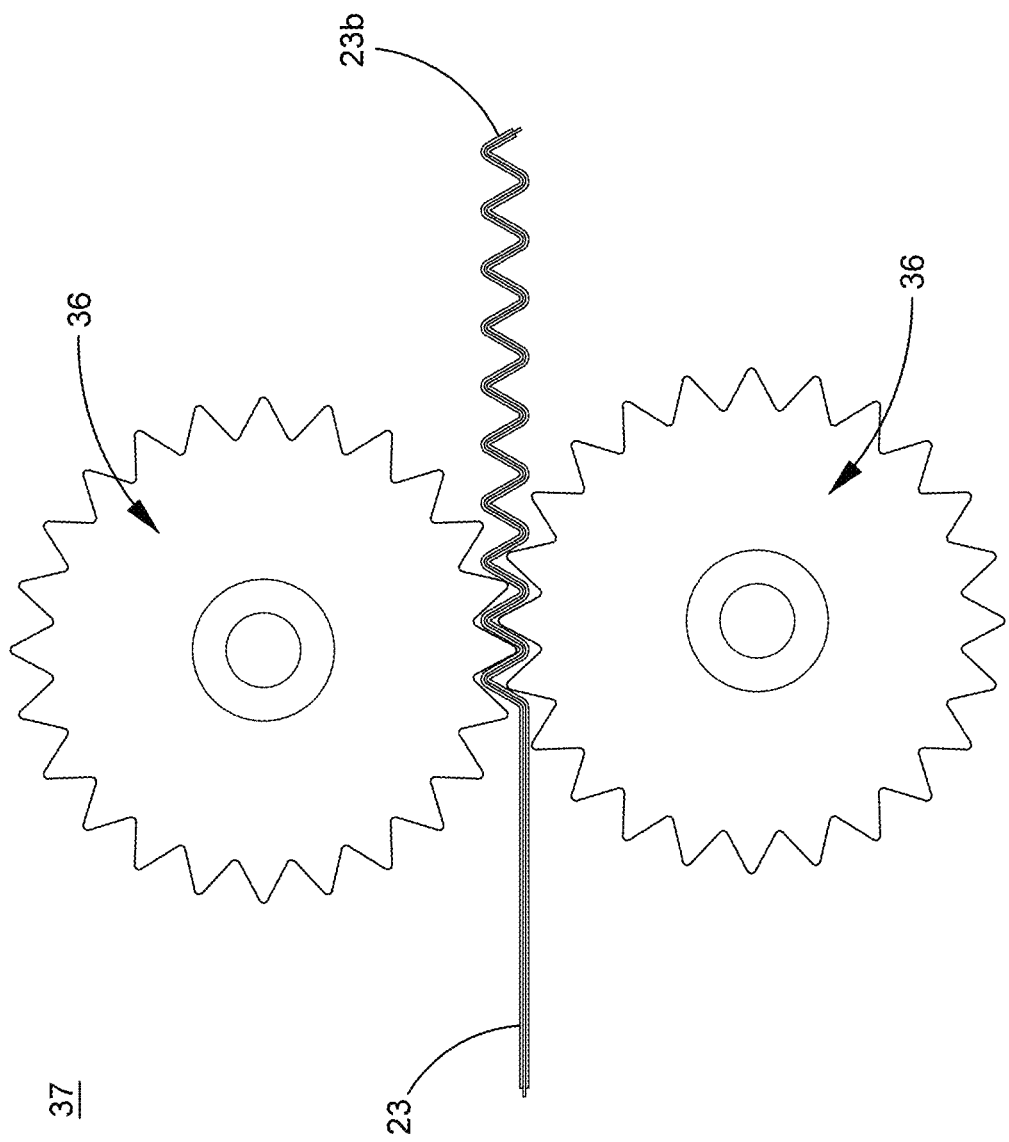
FIG. 9 illustrates a method of producing a corrugated sorbent panel by passing a flat sorbent panel through corrugating rolls.

Now, with primary reference to FIGS. 8 and 9, in particular embodiments, the plurality of corrugated sorbent panels (23b) can be produced by passing a sorbent material sheet (22) through the corrugating rolls (36) of a corrugated rolling mill (37). The corrugating rolls (36) are configured to press and roll-form the sorbent material sheet (22) to create the desired shape of the alternating ridges and valleys for the corrugated sorbent panel (23b). A first flat sorbent panel (23a) can engage a first corrugated panel (23b) to define plurality of corrugated fluid flow channels (38) running parallel to the corrugates in the corrugated sorbent panel (23b). The method can be repeated to achieve a sorbent panel stack (27). In particular embodiments, some of the corrugated fluid flow channels (38) at the sorbent panel perimeter (28) of the sorbent panel stack (27) can be filled with an adhesive (32) or sealant. The sorbent panel stack (27) can then be concurrently cut proximate sorbent panel perimeter (28) to the desired configuration of the water capture module (13) to provide a free-standing water capture module (13).

There can be a substantial advantage in the use of corrugated fluid flow channels (38) in the production of water capture modules (13). Corrugated fluid flow channels (38) can afford an increased pressure drop penalty and a corresponding significant heat transfer enhancement. The average heat transfer coefficient and pressure drop can be enhanced by a factor of about 2.0 to 3.5 relative to those for parallel plate fluid flow channels, depending upon the spacing and phase shift of the corrugates. The friction factor can increase with increasing channel spacing and the corresponding phase shift.

Again, with primary reference to FIG. 8, the corrugates (39) in the corrugated sorbent panels (23b) have generally flat faces (40) of substantially equal length which define, when disposed adjacent a flat sorbent panel (23a), a triangular corrugate fluid flow channel (38). The height of the triangular corrugate fluid flow channel (38) defines the distance between the corresponding pairs of flat sorbent panels. In particular embodiments, the peak-to-peak distance can be about 1.5 millimeters ("mm") to about 5 mm and the overall peak height can be 5 mm to about 10 mm; however, the configuration of the corrugate surfaces can vary in peak-to-peak distance, peak height and curvature depending on the application. The absence of spacer plates (30) and/or adhesive (32) between adjacent sorbent panels (23) can further increase the water uptake capacity, pressure drop penalty and enhance the heat transfer while reducing the friction factor and the thermal penalty.

Figure 10:
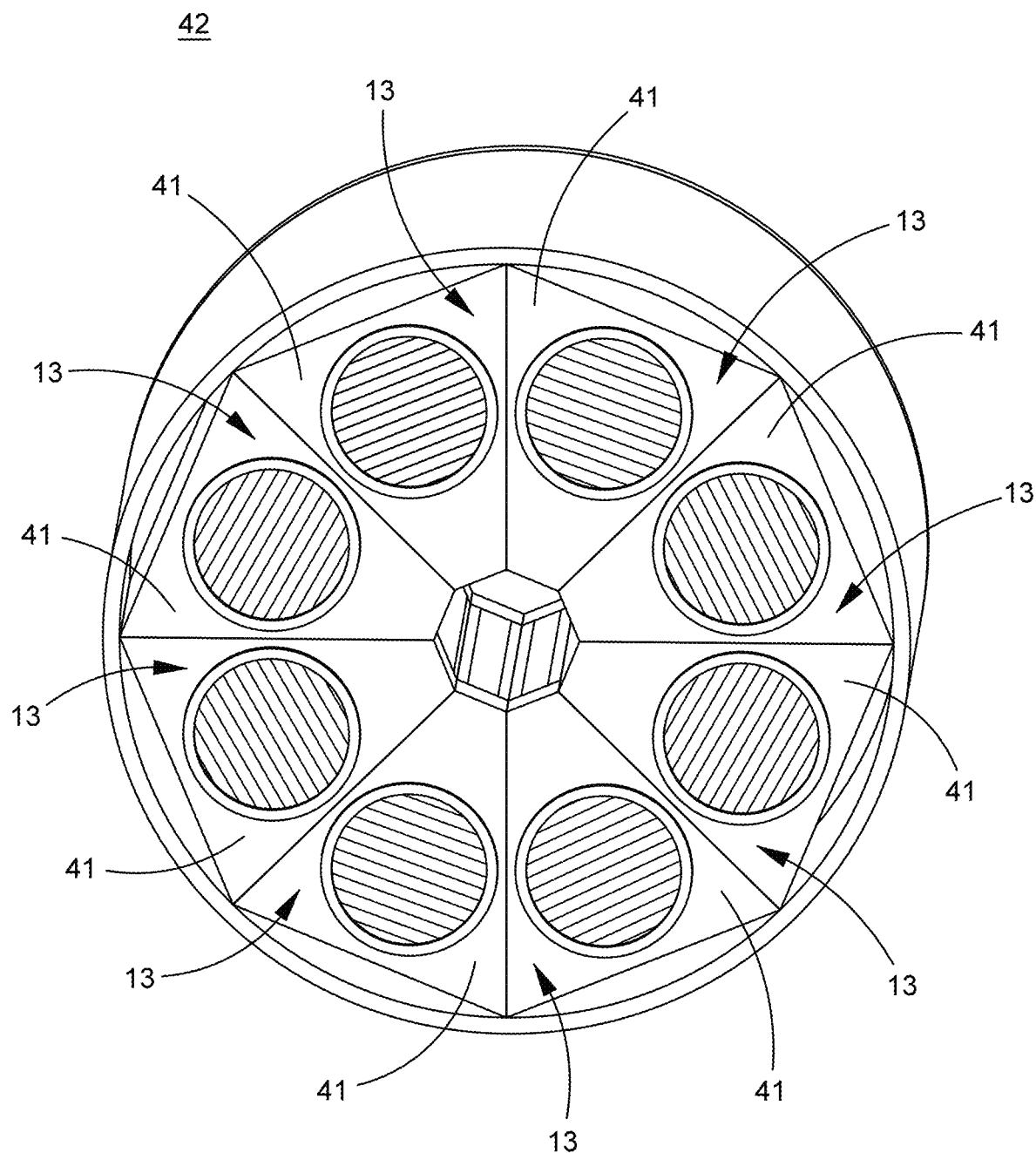
FIG. 10 is a perspective view of a particular embodiment of particular embodiment of an adsorption/desorption structure of a water harvester.

Now, with primary reference to FIG. 10, in particular embodiments, the sorbent panel stack (27) can be assembled inside a framework (41) to protect the sorbent panels (23) from damage or prevent sorbent panel shifting. The framework (41) can provide the casement of the water capture module (13) that can be inserted into and removed from an adsorption/desorption structure (42) of a water harvester (2).

Figure 11:
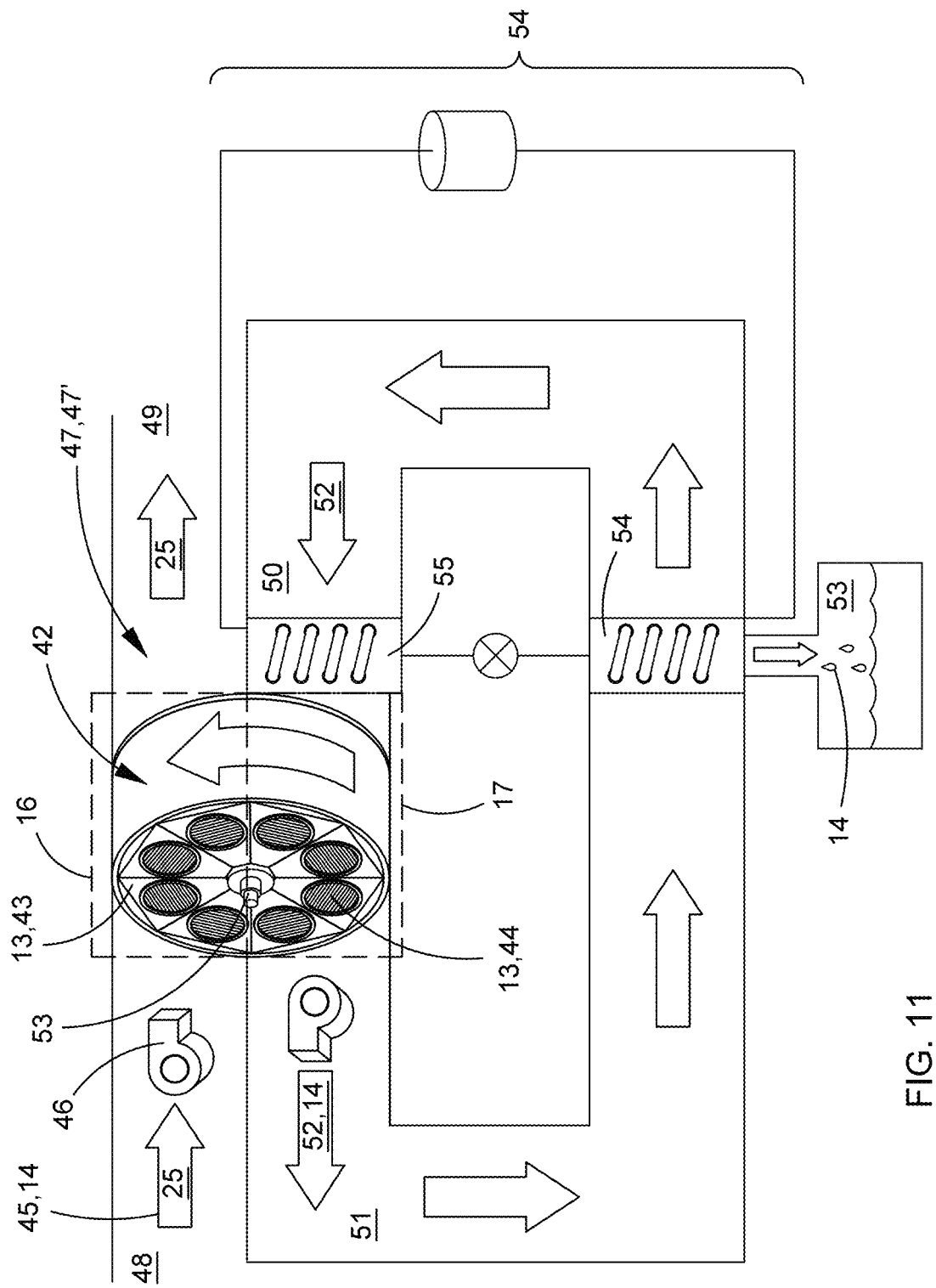
FIG. 11 depicts a block diagram of a particular embodiment of an adsorption/desorption structure operable in a particular embodiment of a water harvester.

Now, with primary reference to FIG. 11 which illustrates an adsorption/desorption structure (42) of a water harvester (2) having a plurality of water capture modules (13) assembled in accordance with embodiments of the invention. When the water harvester (2) operates in a steady state, at least one of the water capture modules (13) is in an adsorption mode (43), and concurrently, at least one of the remaining water capture modules can be in a desorption mode (44). In the adsorption mode (43), sorbent composition layers (3) in the water capture module (13) adsorb water (14) from a process fluid flow, such as the surrounding air (45). An air circulator (46) can draw the surrounding air (45) into each water capture module (13) in the adsorption mode (43), thereby assisting adsorption of water (14) by the sorbent composition layers (3) from the process fluid flow (43). Then, when the water capture module (13) switches into the desorption mode (44), the water capture module (13) desorbs water (14) from the water capture module (13).

Again, with primary reference to FIG. 11, in particular embodiments, a mode-switching structure (47) of the adsorption/desorption structure (42) can switch at least one water capture module (13) from the adsorption mode (43) to the desorption mode (44), and at least one of the remaining water capture module (13) from the desorption mode (44) to the adsorption mode (43). In the illustrative example, the mode-switching structure (47) comprises a rotary structure (47') in which a plurality of water capture modules (13) are mounted. The rotary structure (47') rotates the plurality of water capture modules (13) to shift at least one water capture module (13) to an adsorption sector (16) of the rotary structure (47), wherein the adsorption sector (16) includes a process fluid flow inlet (48) and a process fluid flow outlet (49) to generate an fluid flow (25) of gas(es) through the water capture module (13), whereby the sorbent composition layers (3) in the water capture module (13) adsorb water (14) from the process fluid flow (45). The rotary structure (47') concurrently shifts at least one water capture module (13) to a desorption sector (17) of the rotary structure (47'), wherein the desorption sector (17) includes a desorption fluid flow inlet (50) and a desorption fluid flow outlet (51), wherein heated desorption fluid flow (52) flows from said desorption fluid flow inlet (50) to the desorption fluid flow outlet (51) through the desorption sector (17) of the rotatory structure (47'), whereby the sorbent composition layer (3) desorbs water (14) into the heated desorption fluid flow (52) flowing through the at least one desorption sector (17). In particular embodiments, as depicted in the Figures, the rotary structure (47') can be rotated by a drive assembly (53) to sequentially dispose at least one water capture module (13) in an adsorption sector (16) of the rotary structure (47') and at least one water capture module (13) in a desorption sector (17) of the rotary structure (47'). The heated desorption fluid flow (52) can be sufficiently cooled to condense water (14) from the desorption fluid flow (52). In particular embodiments, the condensed water (14) can be collected in a storage tank (53).

The sorbent compositions (1), water capture modules (13) and the water harvester (2) described herein can decrease the cost of producing water harvesting modules (13) and can increase the efficiency of the water capture modules (13) when compared with conventional sorbent compositions and water capture modules. In some aspects, the time for each adsorption/desorption cycle can be shortened. In other aspects, concurrent adsorption/desorption enables more efficient design of the water harvester. In some variations, the systems described herein can, but need not necessarily, be combined with the components of a heat pump (54) to use the associated condenser (55) to heat the desorption fluid flow release water (14) from the sorbent composition layers (3) of the water capture module (13) and use the associated evaporator (56) to cool the desorption fluid flow (52) to condense liquid water (14).

As can be easily understood from the foregoing, the basic concepts of the present invention may be embodied in a variety of ways. The invention involves numerous and varied embodiments of sorbent compositions, sorbent panels and water capture modules of a water harvester and methods for making and using such sorbent compositions, sorbent panels and water capture modules in water harvesters, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "connector" should be understood to encompass disclosure of the act of "connecting"—whether explicitly discussed or not—and, conversely, were there is a disclosure of the act of "connecting", such a disclosure should be understood to encompass disclosure of a "connector" and even a "means for connecting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the sorbent compositions, sorbent panels, water capture modules and water harvesters herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A water harvester, comprising:
a plurality of sorbent panels disposed in spatially fixed relation defining a fluid flow path between adjacent pairs of said sorbent panels;
wherein each of said sorbent panels includes a layer of a substantially solvent-free sorbent composition, an initial wet sorbent composition of which includes:
a sorbent of about 10 wt. % to about 60 wt. %, wherein said sorbent has a water uptake capacity of about 0.1 to about 2 grams of water per gram of sorbent;
a polymer binder of about 5 wt. % to about 30 wt. %;
a thickener of about 0.25 wt. % to about 5.0 wt. %; and
a solvent comprising the remaining wt. %, wherein said solvent dissolves or emulsifies said binder.

2. A water harvester, comprising:
a plurality of sorbent panels disposed in spatially fixed relation defining a fluid flow path between adjacent pairs of said sorbent panels;
wherein each of said sorbent panels includes a layer of a substantially solvent-free sorbent composition, an initial wet sorbent composition of which includes:
a sorbent of about 10 wt. % to about 60 wt. %, wherein said sorbent has a water uptake capacity of about 0.1 to about 2 grams of water per gram of sorbent;
a polymer binder of about 5 wt. % to about 30 wt. %; and
a solvent comprising the remaining wt. %, wherein said solvent dissolves or emulsifies said binder,
wherein each of said sorbent panels consists of said layer of said substantially solvent-free sorbent composition.

3. The water harvester of claim 2, wherein said plurality of sorbent panels is built up in spatially fixed relation defining said fluid flow path between adjacent pairs of said sorbent panels by a three-dimensional printer using said wet sorbent composition.

4. The water harvester of claim 1, wherein said sorbent comprises one or more of: a silica gel, a molecular sieve, a micropore zeolite, and a metal organic framework.

5. The water harvester of claim 1, wherein said polymer binder comprises one or more of: an acrylic binder, a silicon binder, an acrylic latex binder, a silicone resin, an epoxy resin, an acrylate resin, an alkyd resin, a polyester resin, a vinyl ester resin, a polyvinyl butyral polymer, a polyvinyl alcohol, a carboxymethyl cellulose, a hydroxypropyl methyl cellulose, a polyurethane, and a polyvinylidene fluoride.

6. The water harvester of claim 1, wherein said solvent comprises one or more of: water, ethyl acetate, and ethyl alcohol.

7. The water harvester of claim 1, wherein said thickener comprises: a carboxymethylcellulose, a methylcellulose, a hydroxypropyl methylcellulose, a hydroxyethylcellulose, and an ethyl cellulose.

8. The water harvester of claim 1, wherein said wet sorbent composition has a viscosity of about 900 cps to about 10,000 cps (about 0.9 Pa·s to about 10.0 Pa·s).

9. The water harvester of claim 1, wherein said wet sorbent composition further comprises a dispersant of about 0.25 wt. % to about 5.0 wt. %.

10. The water harvester of claim 9, wherein said dispersant comprises one or more of: a fatty alcohol polyglycol ether sulfate, a phosphoethyl methacrylate polymer, a Na poly(methacrylic acid), a poly(methacrylic acid co-hydroxypropyl acrylate), and a blown menhaden fish oil.

11. The water harvester of claim 9, wherein said wet sorbent composition further comprises a plasticizer of about 1.0 wt. % to about 8.0 wt. %.

12. The water harvester of claim 11, wherein said plasticizer comprises one or more of: a di-isononyl phthalate, a di-isodecyl phthalate, a di-2-ethyl hexyl phthalate, a di-n-octyl phthalate, a dioctyl adipate, an acetyl tri-butyl citrate, and a polyalkylene glycol.

13. The water harvester of claim 1, wherein said wet sorbent composition further comprises a surfactant of about 1.0 wt. % to about 3.0 wt. %.

14. A water harvester, comprising:
a plurality of sorbent panels disposed in spatially fixed relation defining a fluid flow path between adjacent pairs of said sorbent panels;
wherein each of said sorbent panels includes a layer of a substantially solvent-free sorbent composition, the initial wet sorbent composition of which includes:
a sorbent of about 10 wt. % to about 60 wt. %, wherein said sorbent has a water uptake capacity of about 0.1 to about 2 grams of water per gram of sorbent;
a polymer binder of about 5 wt. % to about 30 wt. %; and
a solvent comprising the remaining wt. %, wherein said solvent dissolves or emulsifies said binder,
wherein said sorbent in said layer of substantially solvent-free sorbent composition exhibits a loss of water uptake capacity of less than 15 percent as compared to said sorbent outside of said layer of substantially solvent-free sorbent composition.

15. A water harvester, comprising:
a plurality of sorbent panels disposed in spatially fixed relation defining a fluid flow path between adjacent pairs of said sorbent panels;
wherein each of said sorbent panels includes a layer of a substantially solvent-free sorbent composition, the initial wet sorbent composition of which includes:
a sorbent of about 10 wt. % to about 60 wt. %, wherein said sorbent having a water uptake capacity of about 0.1 grams water per gram of sorbent to about 2 grams of water per gram;
a polymer binder of about 5 wt. % to about 30 wt. %; and
a solvent comprising the remaining wt. %, wherein said solvent dissolves or emulsifies said binder,
wherein said layer of substantially solvent-free sorbent composition has a thickness of about 160 µm to about 350 µm.

16. The water harvester of claim 15, wherein said layer of substantially solvent-free sorbent composition has a water uptake capacity of about 3 mg $H_2O/cm^2$ to about 7.5 mg $H_2O/cm^2$.

17. A water harvester, comprising:
a plurality of sorbent panels disposed in spatially fixed relation defining a fluid flow path between adjacent pairs of said sorbent panels;
wherein each of said sorbent panels includes a layer of a substantially solvent-free sorbent composition, the initial wet sorbent composition of which includes:

a sorbent of about 10 wt. % to about 60 wt. %, wherein said sorbent has a water uptake capacity of about 0.1 to about 2 grams of water per gram of sorbent;
a polymer binder of about 5 wt. % to about 30 wt. %; and
a solvent comprising the remaining wt. %, wherein said solvent dissolves or emulsifies said binder, wherein about 75 wt % to about 85 wt. % of said layer of substantially solvent-free sorbent composition comprises said sorbent.

18. The water harvester of claim 1, wherein each of said sorbent panels comprises a generally flat sorbent panel.

19. The water harvester of claim 18, wherein said sorbent panels are disposed in generally parallel spatially fixed adjacent relation a distance apart defining said fluid flow path between generally flat sorbent panels.

20. A water harvester, comprising:
a plurality of sorbent panels disposed in spatially fixed relation defining a fluid flow path between adjacent pairs of said plurality of sorbent panels:
wherein each of said plurality of sorbent panels includes a layer of a substantially solvent-free sorbent composition, said initial wet sorbent composition of which includes:
a sorbent of about 10 wt. % to about 60 wt. %, wherein said sorbent having a water uptake capacity of about 0.1 grams water per gram of sorbent to about 2 grams of water per gram:
a polymer binder of about 5 wt. % to about 30 wt. %; and
a solvent comprising the remaining wt. %, wherein said solvent dissolves or emulsifies said binder, wherein said plurality sorbent panels comprise a first plurality of corrugated sorbent panels and a second plurality of generally flat sorbent panels.

21. The water harvester of claim 20, wherein said first plurality of corrugated sorbent panels and said second plurality of generally flat sorbent panels disposed in alternating spatially fixed adjacent relation defining a plurality of fluid flow channels running parallel to corrugates in the first plurality of corrugated sorbent panels.

22. The water harvester of claim 1, further comprising a substrate material, wherein said layer of substantially solvent-free sorbent composition is disposed on one side of said substrate material or disposed on both sides of said substrate material.

23. A water harvester, comprising:
a plurality of sorbent panels disposed in spatially fixed relation defining a fluid flow path between adjacent pairs of said plurality of sorbent panels;
wherein each of said plurality of sorbent panels includes a layer of a substantially solvent-free sorbent composition, said initial wet sorbent composition of which includes:
a sorbent of about 10 wt. % to about 60 wt. %, wherein said sorbent having a water uptake capacity of about 0.1 grams water per gram of sorbent to about 2 grams of water per gram;
a polymer binder of about 5 wt. % to about 30 wt. %; and
a solvent comprising the remaining wt. %, wherein said solvent dissolves or emulsifies said binder; and a substrate material, wherein said layer of substantially solvent-free sorbent composition is disposed on one side of said substrate material or disposed on both sides of said substrate material
wherein said layer of substantially solvent-free sorbent composition disposed on said one side of said substrate material or disposed on both sides of said substrate material is capable of being wound into a roll, wherein said layer of substantially solvent-free sorbent composition does not self-adhere.

24. The water harvester of claim 1, wherein said layer of substantially solvent-free sorbent composition is capable of being wound into a roll, wherein said layer of substantially solvent free sorbent composition does not self-adhere.

25. A water harvester, comprising:
a plurality of sorbent panels disposed in spatially fixed relation defining a fluid flow path between adjacent pairs of said plurality of sorbent panels:
wherein each of said plurality of sorbent panels includes a layer of a substantially solvent-free sorbent composition, said initial wet sorbent composition of which includes:
a sorbent of about 10 wt. % to about 60 wt. %, wherein said sorbent having a water uptake capacity of about 0.1 grams water per gram of sorbent to about 2 grams of water per gram;
a polymer binder of about 5 wt. % to about 30 wt. %; and
a solvent comprising the remaining wt. %, wherein said solvent dissolves or emulsifies said binder; and
a water capture module including a framework including a fluid flow inlet and a fluid flow outlet, said framework configured to contain said plurality of sorbent panels disposed in spatially fixed relation defining a fluid flow path between adjacent pairs of said plurality of sorbent panels.

26. The water harvester of claim 25, further comprising an adsorption/desorption structure, wherein a plurality of water capture modules are disposed in said adsorption/desorption structure.

27. The water harvester of claim 26, wherein said adsorption/desorption structure shifts at least one of said plurality of water capture modules from an adsorption mode in which said plurality of sorbent panels adsorb water from a process fluid flow passing through said at least one of said plurality of water capture modules to a desorption mode in which said plurality of sorbent panels desorb water into a heated fluid flow passing through said at least one water capture module.

28. The water harvester of claim 27, wherein said adsorption/desorption structure shifts said at least one water capture module from a desorption mode in which said plurality of sorbent panels desorb water into a heated fluid flow passing through said at least one water capture module to an adsorption mode in which said plurality of sorbent panels adsorb water from a process fluid flow passing through said at least one of said plurality of water capture modules.

29. The water harvester of claim 28, wherein said adsorption/desorption structure includes a rotary structure in which said plurality of water capture modules are mounted, said rotary structure is configured to rotate to move at least one of said plurality of water capture modules from a desorption sector to an adsorption sector of said adsorption/desorption structure, and to concurrently move at least one said plurality of water capture modules from an adsorption sector to a desorption section of said adsorption/desorption structure.

30. The water harvester of claim 13, wherein said surfactant comprises one or more of: an ethoxylate, an alkoxylate, a secondary ethoxylated alcohol, a polyethylene glycol stearate, a lauryl alcohol ethoxylate, a sorbitan esters, a lauryl glucoside, a polyoxyethylene alkyl ethers, a fatty alcohol ethoxylate, an alkyl phenol ethoxylate, a fatty acid alkoxylate, and a (p-tert-octylphenoxy)polyethoxyethanol.

* * * * *